US008275258B2

(12) United States Patent
Kai et al.

(10) Patent No.: US 8,275,258 B2
(45) Date of Patent: Sep. 25, 2012

(54) OPTICAL COMMUNICATION BASE STATION, OPTICAL SIGNAL CONVERSION APPARATUS, AND OPTICAL SIGNAL CONVERSION METHOD

(75) Inventors: Yutaka Kai, Kawasaki (JP); Yasuhiko Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 461 days.

(21) Appl. No.: 12/461,267

(22) Filed: Aug. 5, 2009

(65) Prior Publication Data

US 2009/0297162 A1   Dec. 3, 2009

Related U.S. Application Data

(63) Continuation of application No. PCT/JP2007/056386, filed on Mar. 27, 2007.

(51) Int. Cl.
*H04B 10/08* (2006.01)
(52) U.S. Cl. .......................................................... 398/25
(58) Field of Classification Search .................... 398/67, 398/70, 72, 25
See application file for complete search history.

(56) References Cited

U.S. PATENT DOCUMENTS

| 6,215,414 | B1 | 4/2001 | Kuramatsu |
| 6,944,400 | B2 | 9/2005 | Kashima |
| 171,117 | A1 | 1/2007 | Gripp et al. |
| 2002/0044319 | A1 | 4/2002 | Kashima |

FOREIGN PATENT DOCUMENTS

| JP | 2-64965 | 3/1990 |
| JP | 8-8954 | 1/1996 |
| JP | 10-70509 | 3/1998 |
| JP | 10-262074 | 9/1998 |
| JP | 10-341469 | 12/1998 |
| JP | 2000-184409 | 6/2000 |
| JP | 2002-124919 | 4/2002 |
| JP | 2002-135325 | 5/2002 |
| JP | 2002-290378 | 10/2002 |
| JP | 2005-33537 | 2/2005 |
| JP | 2006-081014 | 3/2006 |
| JP | 2006-262088 | 9/2006 |
| JP | 2007-19797 | 1/2007 |

OTHER PUBLICATIONS

Partial English translation of Japanese Publication of Unexamined Patent No. 2005-33537 (Ref. AG in the IDS filed May 5, 2011).
Office Action issued Nov. 2, 2011 in corresponding Chinese Patent Application No. 200780052242.3.
Japanese Office Action issued on Mar. 8, 2011 in corresponding Japanese Patent Application 2009-506146.
International Search Report for PCT/JP2007/056386, mailed Jun. 19, 2007.

*Primary Examiner* — Leslie Pascal
(74) *Attorney, Agent, or Firm* — Staas & Halsey LLP

(57) ABSTRACT

An optical communication base station which receives an upstream optical signal having an upstream bit rate specific to each one of a plurality of lower order communication units from a corresponding one of the plurality of lower order communication units, and which transmits a downstream optical signal having a downstream bit rate specific to each one of the plurality of lower order communication units to a designated one of the plurality of lower order communication units, includes: a first optical signal conversion unit which changes the bit rate of the upstream optical signal and thereby converts the upstream optical signal into a fixed bit-rate inter-station optical signal; and a second optical signal conversion unit which converts the inter-station optical signal into the downstream optical signal by changing the bit rate of the inter-station optical signal according to the designated one of the plurality of lower order communication units.

11 Claims, 31 Drawing Sheets

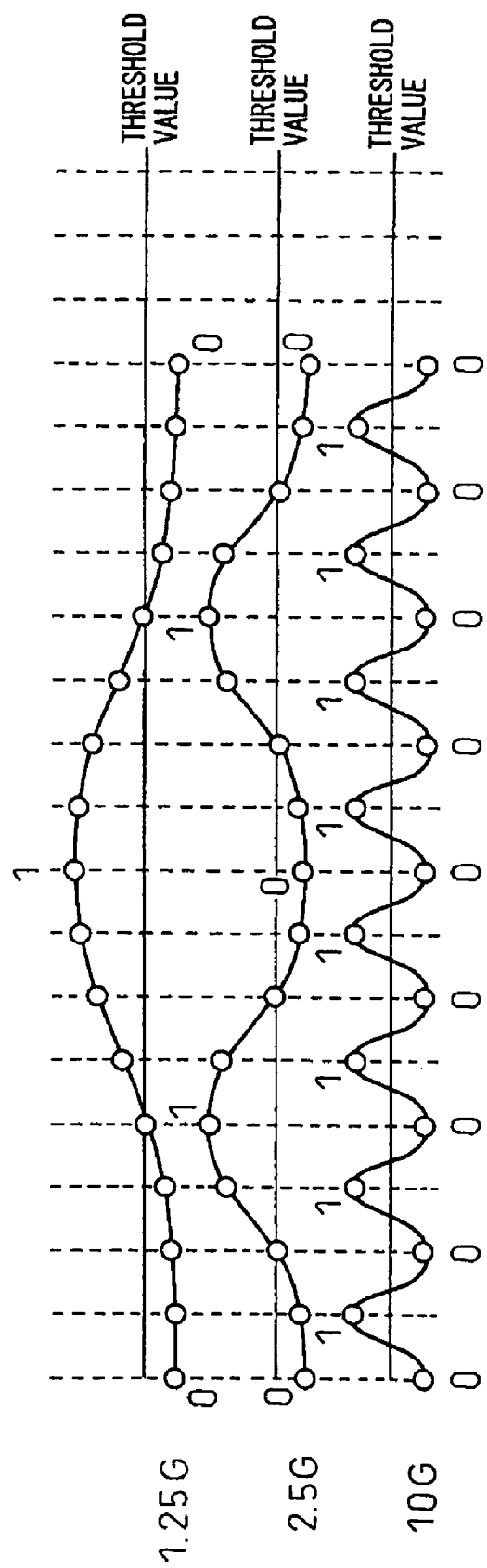

US 8,275,258 B2

OPTICAL COMMUNICATION BASE STATION, OPTICAL SIGNAL CONVERSION APPARATUS, AND OPTICAL SIGNAL CONVERSION METHOD

CROSS REFERENCE TO RELATED APPLICATION

The present application is a continuation application based on International application No. PCT/JP2007/056386, filed on Mar. 27, 2007.

TECHNICAL FIELD

The present invention relates to an optical access network system in which the network from the central office of a communication provider up to the subscriber terminal is constructed of an optical communication network. More particularly, the invention relates to an optical access network system that can change the bit rate according to the subscriber and that enables upstream optical signals from the subscriber to the base station to be transmitted in a burst.

BACKGROUND ART

Various types of networks have been proposed for next generation optical access network systems that transmit optical signals to subscriber terminals without converting the signals into electrical form. Such optical access network systems include, for example, E-PON (Ethernet (registered trademark) Passive Optical Network) developed based on B-PON (Broadband PON) that supports ATM frames and adapted to support Ethernet (registered trademark) frames, GE-PON adapted to support Gigabit Ethernet (registered trademark), and G-PON whose implementations vary among system vendors.

In the PON system which is a passive double star (PDS) network, the network is constructed using only passive optical components, and contains no active elements that perform optical-to-electrical conversion on the way as in an active double star (ADS) network. This offers the advantage of being able to construct an end-to-end optical network at low cost. Further, deployment of WDM-PON that uses wavelength division multiplexed (WDM) signals is also being studied because of its low per-bit cost.

FIG. 1 illustrates schematically the configuration of a prior art PON system. As illustrated, the prior art PON system includes a central office optical line terminal OLT, optical network units ONU1 to ONU32 as optical communication terminals one for each subscriber, and an optical coupler which causes an optical transmission line leading from the optical line terminal OLT to branch out at an intermediate point.

For downstream traffic from the optical line terminal OLT to the optical network units ONU1 to ONU32, a continuous wave optical signal, for example, at the 1.49-μm band, is used. The optical line terminal OLT transmits the downstream signal at a fixed bit rate common to the optical network units ONU1 to ONU32 while maintaining synchronization with the respective network units.

On the other hand, for upstream traffic from the optical network units ONU1 to ONU32 to the optical line terminal OLT, an optical signal, for example, at the 1.3-μm band, is used. The optical network units ONU1 to ONU32 each transmit the upstream signal when the downstream signal is received from the optical line terminal OLT. The upstream signal also is transmitted at a fixed bit rate common to the respective network units.

Patent document 1 listed below discloses an optical access system in which an optical service unit (OSU) is connected to a plurality of optical network units (ONUs) via a plurality of power splitters, wherein downstream signal light having a plurality of wavelengths is split for the each power splitters by a wavelength splitting means disposed between the OSU and the power splitters.

Patent document 1: Japanese Unexamined Patent Publication No. 2006-81014

DISCLOSURE OF THE INVENTION

According to a first mode of the present invention, there is provided an optical communication base station which receives an upstream optical signal having an upstream bit rate specific to each one of a plurality of lower order communication units from a corresponding one of the plurality of lower order communication units, and which transmits a downstream optical signal having a downstream bit rate specific to each one of the plurality of lower order communication units to a designated one of the plurality of lower order communication units. The optical communication base station includes: a first optical signal conversion unit which changes the bit rate of the upstream optical signal and thereby converts the upstream optical signal into a fixed bit-rate inter-station optical signal to be received by a receiving correspondent station; and a second optical signal conversion unit which converts the inter-station optical signal received from a transmitting correspondent station into the downstream optical signal by changing the bit rate of the inter-station optical signal according to the designated lower order communication unit.

According to a second mode of the present invention, there is provided an optical signal conversion apparatus for converting a first optical signal into a fixed bit-rate second optical signal, the first optical signal being received from each one of a plurality of communication units that transmit optical signals at different bit rates. The optical signal conversion apparatus includes: an optical-to-electrical conversion unit which converts the first optical signal into an electrical signal; a code decision unit which makes code decisions on the electrical signal at a provisional decision clock frequency corresponding to a bit rate equal to an integral multiple of the highest of the bit rates that the plurality of communication units use; a storage unit which temporarily stores a code sequence obtained as a provisional code sequence by the code decisions; and a code correction unit which regenerates an original code sequence by correcting code sequence length of the provisional code sequence temporarily stored in the storage unit.

According to a third mode of the present invention, there is provided an optical signal conversion apparatus for converting a fixed bit-rate second optical signal into a first optical signal for transmission to a designated one of a plurality of communication units that receive optical signals at different bit rates. The optical signal conversion apparatus includes: an optical-to-electrical conversion unit which converts the second optical signal into an electrical signal; a synchronous clock extraction unit which extracts a synchronous clock from the electrical signal; a code decision unit which makes code decisions on the electrical signal by using the synchronous clock; a storage unit which stores a code sequence obtained by the code decisions; and a modulation unit which generates the first optical signal by modulating prescribed carrier light with a signal obtained by reading out the code sequence from the storage unit at the bit rate that the designated communication unit uses.

According to a fourth mode of the present invention, there is provided an optical signal conversion method for converting a first optical signal into a fixed bit-rate second optical signal, the first optical signal being received from each one of a plurality of communication units that transmit optical signals at different bit rates. The optical signal conversion method includes: converting the first optical signal into an electrical signal; making code decisions on the electrical signal at a provisional decision clock frequency corresponding to a bit rate equal to an integral multiple of the highest of the bit rates that the plurality of communication units use; temporarily storing in a specified storage unit a code sequence obtained as a provisional code sequence by the code decisions; regenerating an original code sequence by correcting code sequence length of the provisional code sequence temporarily stored in the storage unit; and generating the second optical signal by modulating prescribed carrier light with the original code sequence.

According to a fifth mode of the present invention, there is provided an optical signal conversion method for converting a fixed bit-rate second optical signal into a first optical signal for transmission to a designated one of a plurality of communication units that receive optical signals at different bit rates. The optical signal conversion method includes: converting the second optical signal into an electrical signal; extracting a synchronous clock from the electrical signal; making code decisions on the electrical signal by using the synchronous clock; storing in a specified storage unit a code sequence obtained by the code decisions; and generating the first optical signal by modulating prescribed carrier light with a signal obtained by reading out the code sequence from the storage unit at the bit rate that the designated communication unit uses.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 12A is a diagram illustrating the relationship between the timing for making provisional code decisions and the respective preamble signals depicted in FIG. 11.

BEST MODE FOR CARRYING OUT THE INVENTION

Figure 1:
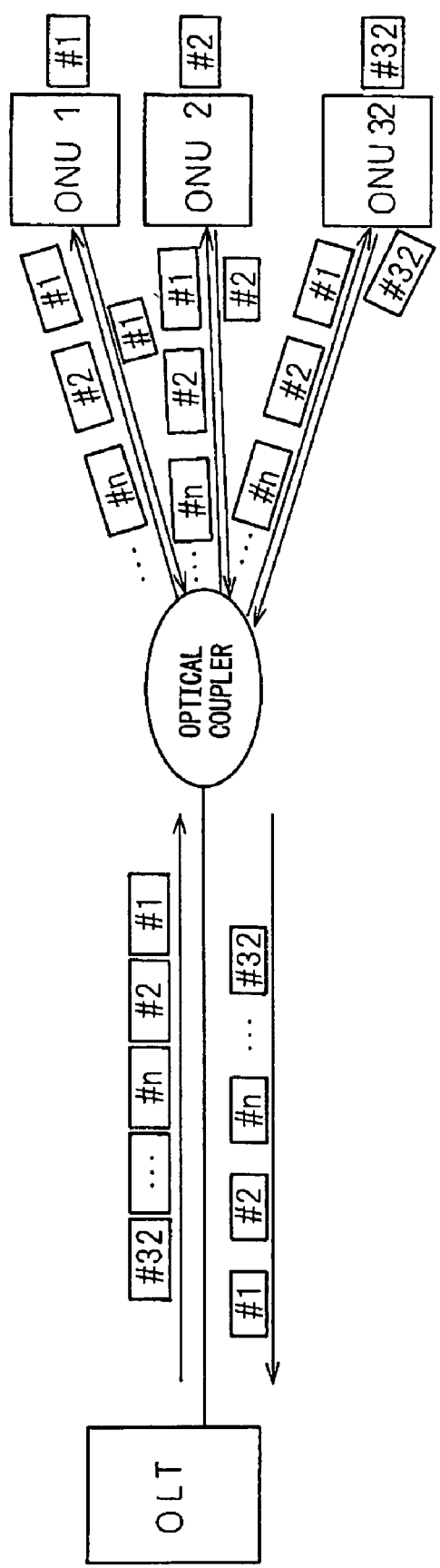
FIG. 1 is a diagram illustrating schematically the configuration of a prior art PON system.
Figure 2:
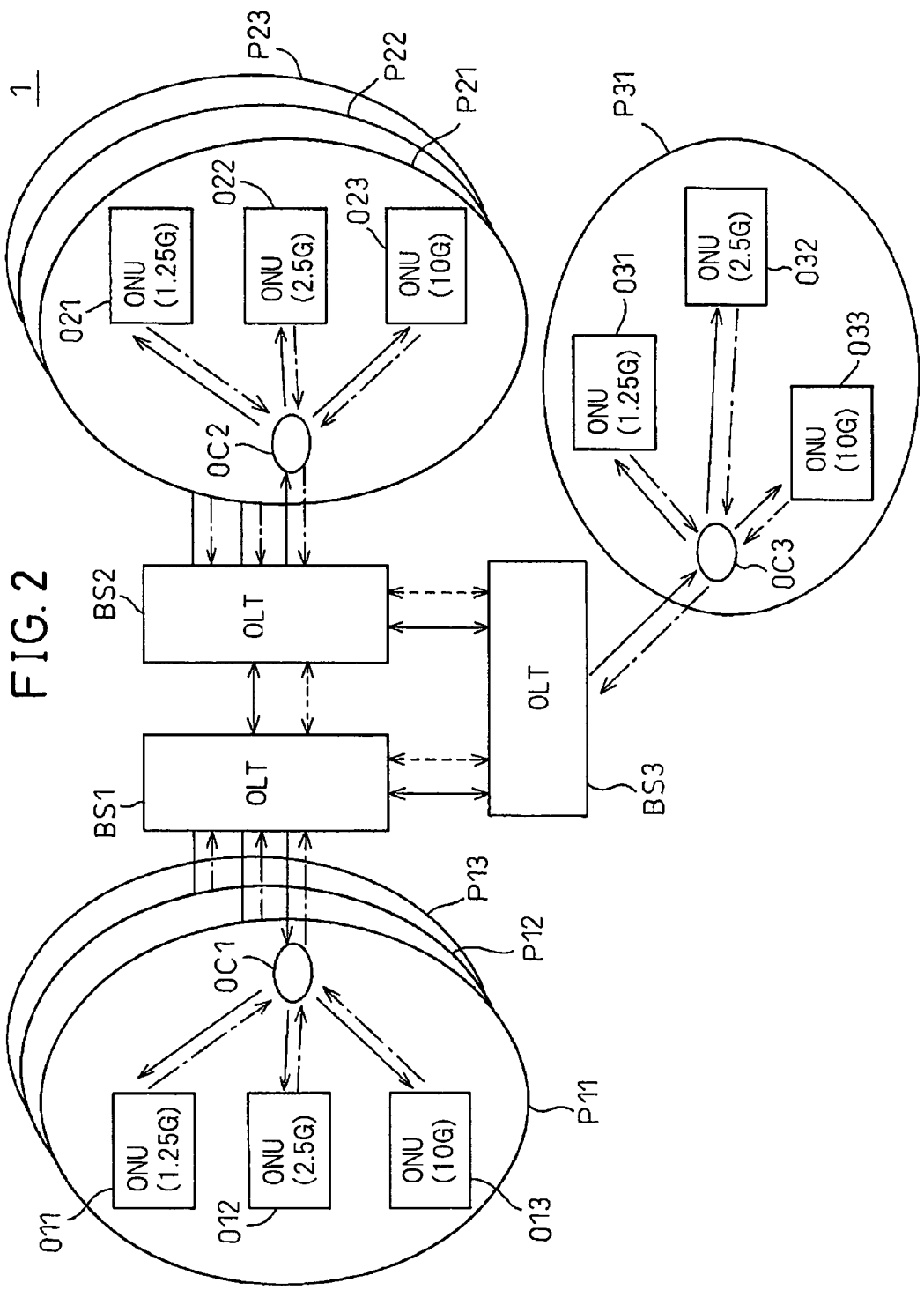
FIG. 2 is a diagram illustrating a first configuration example of an optical communication system according to an embodiment of the present invention.

An embodiment of the present invention will be described with reference to the accompanying drawings. FIG. 2 is a diagram illustrating a first configuration example of an optical communication system according to the embodiment of the present invention.

The optical communication system 1 includes a plurality of base stations BS1 to BS3 and PON systems which connect thereto optical network units O11 to O13, O21 to O23, and O31 to O33, respectively, as lower order communication units served by the respective base stations BS1 to BS3.

The base station BS1 contains central office optical line terminals (OLTs) for a plurality of PON systems P11 to P13. Likewise, the base station BS2 contains central office optical line terminals for a plurality of PON systems P21 to P23, and the base station BS3 contains a central office optical line terminal for a single PON system P31.

Each PON system includes optical network units (ONUs) and an optical coupler which causes an optical transmission line leading from the optical line terminal to the optical network units to branch out at an intermediate point therebetween. In the illustrated example, the PON system P11 whose optical line terminal is located at the base station BS1 contains the optical coupler OC1 and optical network units O11 to O13, and the PON system P21 whose optical line terminal is located at the base station BS2 contains the optical coupler OC2 and optical network units O21 to O23, while the PON system P31 whose optical line terminal is located at the base station BS3 contains the optical coupler OC3 and optical network units O31 to O33.

It is assumed that between the respective base stations BS1 to BS3, optical burst packet signals are transferred at a fixed bit rate (for example, 40 Gbps) and, between the base station BS1 and the respective optical network units O11 to O13, optical packet signals are transferred at bit rates specific to the respective optical network units O11 to O13. Likewise, between the base station BS2 and the respective optical network units O21 to O23, optical packet signals are transferred at bit rates specific to the respective optical network units O21 to O23 and, between the base station BS3 and the respective optical network units O31 to O33, optical packet signals are transferred at bit rates specific to the respective optical network units O31 to O33.

In the illustrated example, the bit rates used for transmission between the base station BS1 and the respective optical network units O11, O12, and O13 are 1.25 Gbps, 2.5 Gbps, and 10 Gbps, respectively, and the bit rates used for transmission between the base station BS2 and the respective optical network units O21, O22, and O23 are 1.25 Gbps, 2.5 Gbps, and 10 Gbps, respectively; likewise, the bit rates used for transmission between the base station BS3 and the respective optical network units O31, O32, and O33 are 1.25 Gbps, 2.5 Gbps, and 10 Gbps, respectively.

In order to accommodate the optical network units of different bit rates in each PON system, each base station includes, as will be described later, a multi-rate-receive/fixed-rate-transmit transponder which receives an upstream optical signal transmitted at a bit rate specific to each individual optical network unit, converts it into a fixed bit-rate optical signal by changing its bit rate, and transmits out the thus converted optical signal, and a fixed-rate-receive/multi-rate-transmit transponder which receives a fixed bit-rate optical signal, converts it by changing its bit rate into a downstream optical signal having a bit rate specific to each individual optical network unit, and transmits out the thus converted optical signal.

The multi-rate-receive/fixed-rate-transmit transponder corresponds to the first optical signal conversion unit described in the appended claims of the present invention, and the fixed-rate-receive/multi-rate-transmit transponder corresponds to the second optical signal conversion unit described in the appended claims of the present invention.

The following description of the embodiment is given by assuming that the inter-base-station optical signal transferred between the base stations is an optical packet burst signal that contains routing information (destination information) of the signal. However, the scope of the present invention is not limited to such an embodiment, but the inter-base-station optical signal may be a simple burst optical signal that does not carry by itself routing information.

When the inter-base-station optical signal does not carry routing information, the routing information is transmitted separately from the inter-base-station optical signal that carries user data. Examples in which the routing information is transmitted separately from the inter-base-station optical signal will be described as needed in the following description of the embodiment. Further, in this specification and the appended claims of the invention, the optical packet burst signal and the simple burst optical signal that does not carry routing information may sometimes be referred to collectively as the "optical burst signal."

In FIG. 2, the signal lines indicated by solid lines and the signal lines indicated by semi-dashed lines are intended to carry optical signals at different wavelength bands, which may be, for example, 1.3-μm and 1.5-μm bands, respectively. This also applies to FIGS. 3, 18, 19, and 23. Further, in FIG. 2, the signal lines indicated by dashed lines between the respective base stations BS1 to BS3 indicate the signal lines for transferring the routing information separately from the inter-base-station optical signal when the inter-base-station optical signal is one that does not carry routing information.

Figure 3:
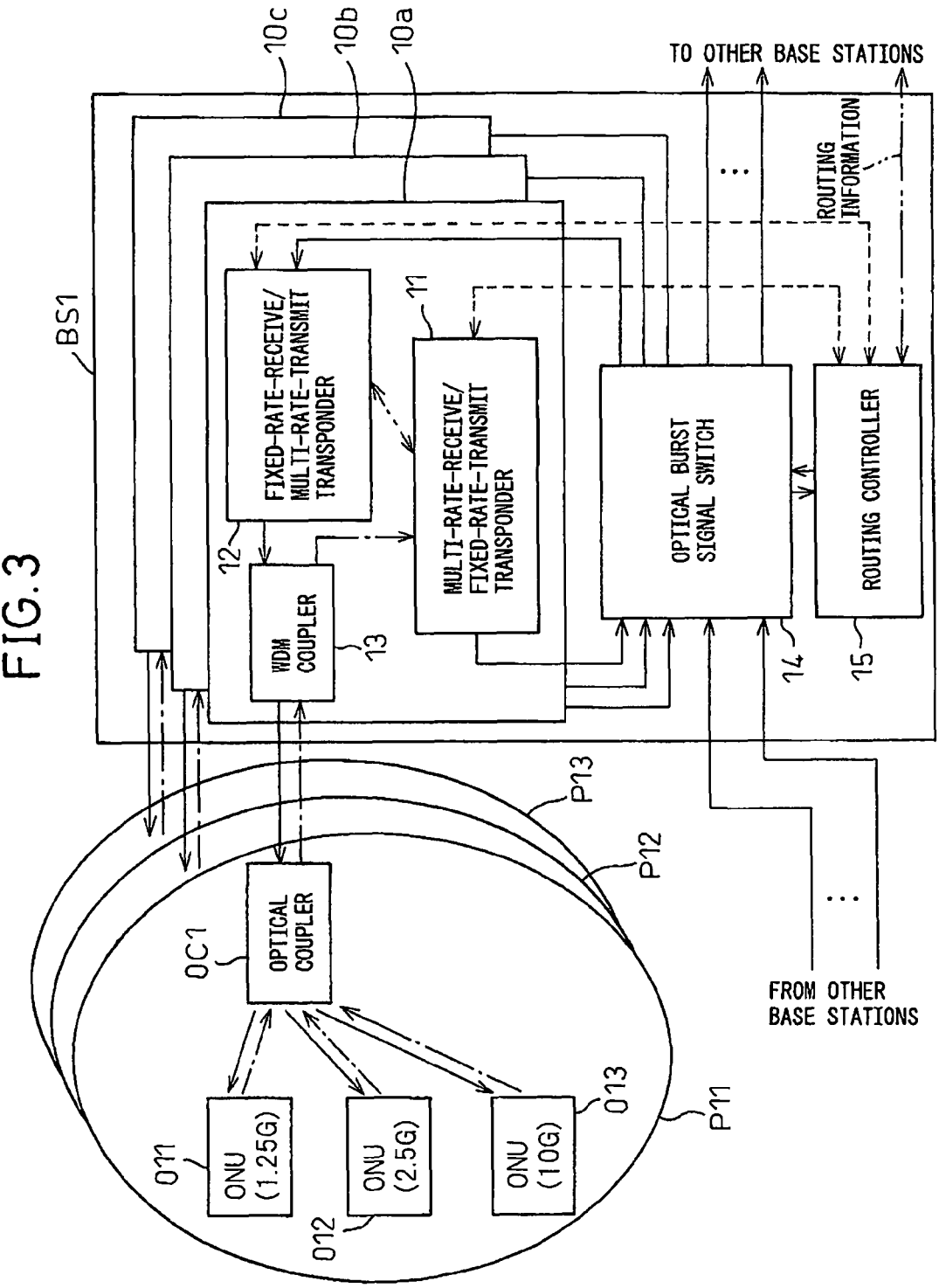
FIG. 3 is a diagram illustrating a first configuration example of a base station depicted in FIG. 2.

FIG. 3 is a diagram illustrating a first configuration example of the base station BS1 depicted in FIG. 2. The configuration is the same for the other base stations BS2 and BS3. The base station BS1 includes OLT units 10a to 10c as the central office optical line terminals of the respective PON systems P11 to P13, an optical burst signal switch 14 for exchanging optical packet signals between the respective OLT units 10a to 10c and between the OLT units 10a to 10c and the other base stations BS2 and BS3, and a routing controller 15 which controls the optical signal switch based on the routing information carried in the optical packet signal. In the following description, the OLT units 10a to 10c may sometimes be referred to collectively as the "OLT unit 10."

Each OLT unit 10 includes a WDM coupler 13 for separating upstream and downstream signals from each other, a multi-rate-receive/fixed-rate-transmit transponder 11, and a fixed-rate-receive/multi-rate-transmit transponder 12.

The multi-rate-receive/fixed-rate-transmit transponder 11 receives an upstream optical signal transmitted at a bit rate specific to each individual optical network unit, converts it into the fixed bit-rate inter-base-station optical signal by changing its bit rate, and transmits out the thus converted optical signal.

The fixed-rate-receive/multi-rate-transmit transponder 12 receives the fixed bit-rate inter-base-station optical signal, converts it by changing its bit rate into a downstream optical signal having a bit rate specific to each individual optical network unit, and transmits out the thus converted optical signal.

Optical transmission lines over which the inter-base-station optical signals are transmitted from the other base stations BS2 and BS3 and an optical output terminal of the multi-rate-receive/fixed-rate-transmit transponder 11 in each OLT unit 10 are connected to the input ports of the optical burst signal switch 14. On the other hand, optical transmission lines over which the inter-base-station optical signals are transmitted to the other base stations BS2 and BS3 and an optical input terminal of the fixed-rate-receive/multi-rate-transmit transponder 12 in each OLT unit 10 are connected to the output ports of the optical burst signal switch 14.

The routing controller 15 includes a first optical network unit address table which stores mapping between the addresses of the optical network units contained in the optical communication system 1 and the base stations to which the respective optical network units belong, and a second optical network unit address table which stores mapping between the addresses of the optical network units belonging to the base station that contains the routing controller 15 and the PON systems to which the respective optical network units belong.

The routing controller 15 further includes an output port mapping table which stores mapping between the output ports of the optical burst signal switch 14 and the base stations connected to the respective output ports and mapping between the output ports of the optical burst signal switch 14 and the OLT units 10 connected to the respective output ports.

When an optical packet signal is input to an input port of the optical burst signal switch 14, the routing controller 15 reads its routing information. If the destination designated by the routing information indicates the address of one of the optical network units belonging to the other base stations BS2 and BS3, the routing controller 15 controls the optical burst signal switch 14 so that the input optical packet signal is directed to the output port connected to the base station to which the destination optical network unit belongs.

On the other hand, if the destination designated by the routing information indicates the address of one of the optical network units belonging to the station BS1, the routing controller 15 controls the optical burst signal switch 14 so that the input optical packet signal is directed to the output port connected to the OLT unit 10 belonging to the PON system to which the destination optical network unit belongs.

When the inter-base-station optical signal is not an optical packet signal, that is, when it is a burst optical signal that does not carry routing information, the routing controller 15 performs the following processing instead of the processing performed using the routing information carried in the optical packet signal.

1. When the inter-base-station optical signal received from one of the other base stations BS2 and BS3 is input to the optical burst signal switch 14, the routing controller 15 controls the optical burst signal switch 14 based on the routing information received from the one of the other base stations BS2 and BS3 to accompany the inter-base-station optical signal. If the destination designated by the routing information indicates the address of one of the optical network units belonging to the base station BS1, the inter-base-station optical signal is delivered to the OLT unit 10 belonging to the PON system to which the optical network unit designated as the destination belongs.

In this case, the routing controller 15 transfers the routing information to the fixed-rate-receive/multi-rate-transmit transponder 12 in the OLT unit 10 to which the inter-base-station optical signal is delivered. This routing information is transferred via a control signal line connecting between the routing controller 15 and the fixed-rate-receive/multi-rate-transmit transponder 12 as indicated by a dashed line in FIG. 3.

2. When the optical burst signal from the multi-rate-receive/fixed-rate-transmit transponder 11 is input to the optical burst signal switch 14, the routing controller 15 receives the routing information for the optical burst signal from the multi-rate-receive/fixed-rate-transmit transponder 11, and controls the optical burst signal switch 14 based on the routing information. This routing information is transferred via a control signal line connecting between the routing controller 15 and the multi-rate-receive/fixed-rate-transmit transponder 11 as indicated by a dashed line in FIG. 3.

If the destination designated by the routing information indicates the address of one of the optical network units belonging to the other base stations BS2 and BS3, the optical burst signal is the inter-base-station optical signal which is transmitted to the base station to which the optical network unit designated as the destination belongs. In this case, the routing controller 15 delivers the routing information, received from the multi-rate-receive/fixed-rate-transmit transponder 11, to the base station to which the inter-base-station optical signal is transmitted. This routing information is delivered via a control signal line connecting between the routing controller 15 and the corresponding base station as indicated by a semi-dashed line in FIG. 3.

In this way, the bit rate differences between the respective optical network units O11 to O13 are accommodated by using the multi-rate-receive/fixed-rate-transmit transponder 11 and the fixed-rate-receive/multi-rate-transmit transponder 12 in OLT units 10 of the base station and, when communicating with any one of the other base stations BS2 and BS3, the signal is transmitted by converting it into an optical packet signal of a higher fixed bit rate; this arrangement serves to achieve efficient network construction.

Furthermore, since modifications necessary to implement the present invention primarily occur on the base station side, the optical network units of different bit rates can be allowed to exist within the same PON system, allowing the use of the existing optical network units O11 to O13. This serves to achieve low-cost and flexible upgrading of the equipment.

The method of communication according to the optical communication system 1 of the present invention will be described below with reference to FIG. 2. First, consider the case where communication is performed between an optical network unit A operating at 1.25 Gbps in the PON system P11 and an optical network unit B operating at 2.5 Gbps in the PON system P12.

The 1.25-Gbps upstream optical signal transmitted from the optical network unit A in the PON system P11 is received by the multi-rate-receive/fixed-rate-transmit transponder 11 in the OLT unit 10a of the base station BS1. The multi-rate-receive/fixed-rate-transmit transponder 11 converts the received 1.25-Gbps upstream optical signal into a 40-Gbps fixed bit-rate optical signal, and transfers it to the optical burst signal switch 14. Since the routing information of this optical signal carries the address of the optical network unit B as the destination address, the routing controller 15 controls the optical burst signal switch 14 based on the routing information so that the optical signal is directed to the fixed-rate-receive/multi-rate-transmit transponder 12 in the OLT unit 10b of the base station BS1.

The fixed-rate-receive/multi-rate-transmit transponder 12 converts the received optical signal of the 40-Gbps fixed bit rate into a 2.5-Gbps downstream optical signal that matches the bit rate of the optical network unit B. The fixed-rate-receive/multi-rate-transmit transponder 12 transmits the downstream optical signal to the optical network unit B by using time slots allocated to the optical network unit B.

Next, consider the case where the optical network unit A in the PON system P11 performs communication with an optical network unit F operating at 10 Gbps in the PON system P21 served by another base station BS2.

The upstream optical signal transmitted from the optical network unit A is converted by the multi-rate-receive/fixed-rate-transmit transponder 11 in the OLT unit 10a of the base station BS1 into a 40-Gbps fixed bit-rate inter-base-station optical signal which is then transferred to the optical burst signal switch 14. Since the routing information of this inter-base-station optical signal carries as the destination address the address of the optical network unit F belonging to the base station BS2, the inter-base-station optical signal is transmitted via the optical burst signal switch 14 to the base station BS2.

The inter-base-station optical signal received by the base station BS2 is directed via the optical burst signal switch 14 to the fixed-rate-receive/multi-rate-transmit transponder 12 in the OLT unit 10 belonging to the PON system P21 to which the optical network unit F belongs. The fixed-rate-receive/multi-rate-transmit transponder 12 converts the received optical signal of the 40-Gbps fixed bit rate into a 10-Gbps downstream optical signal that matches the bit rate of the optical network unit F. The fixed-rate-receive/multi-rate-transmit transponder 12 transmits the downstream optical signal to the optical network unit F by using time slots allocated to the optical network unit F.

Figure 4:
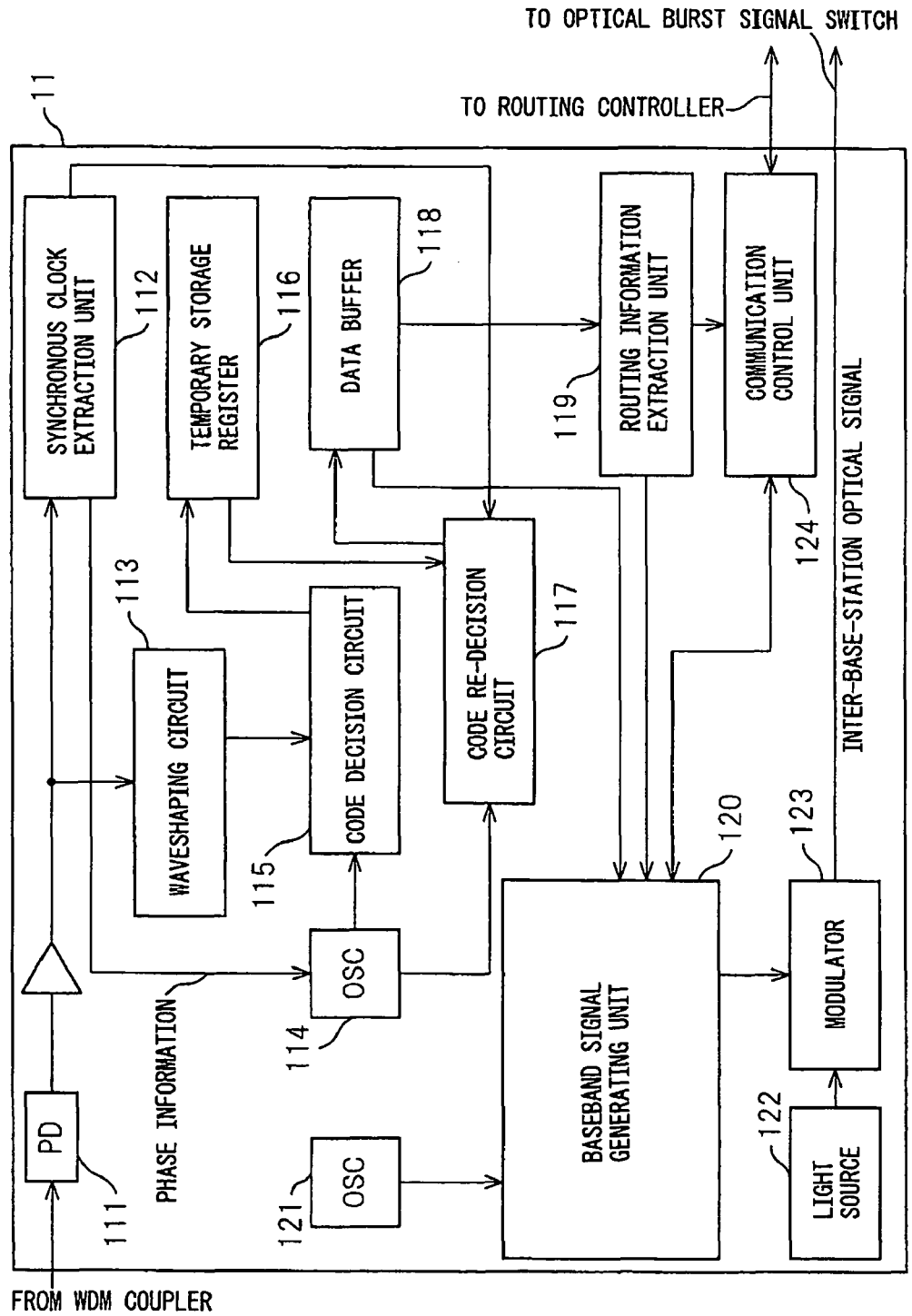
FIG. 4 is a diagram illustrating a first configuration example of a multi-rate-receive/fixed-rate-transmit transponder depicted in FIG. 3.

FIG. 4 is a diagram illustrating a first configuration example of the multi-rate-receive/fixed-rate-transmit transponder 11 depicted in FIG. 3.

The multi-rate-receive/fixed-rate-transmit transponder 11 includes a photodetector (PD) 111 which converts the upstream optical signal received from the WDM coupler into an electrical received signal, a synchronous clock extraction unit 112 which extracts a synchronous clock from the electrical received signal, a waveshaping circuit 113 which performs waveshaping on the electrical received signal output from the photodetector 111, an oscillator 114 which generates a provisional decision clock corresponding to the highest bit rate of 10 Gbps among the bit rates that the optical network units O11 to O13 use, and a code decision circuit 115 which makes code decisions on the electrical received signal at the frequency of the provisional decision clock.

The multi-rate-receive/fixed-rate-transmit transponder 11 further includes a temporary storage register 116 which temporarily stores a provisional code sequence obtained as a result of the code decisions made by the code decision circuit 115, a code re-decision circuit 117 which regenerates the original code sequence by correcting, using the synchronous clock extracted by the synchronous clock extraction unit 112, the code sequence length of the provisional code sequence stored in the temporary storage register 116, a data buffer 118 which stores the thus regenerated original code sequence, and a routing information extraction unit 119 which extracts, from the original code sequence stored in the data buffer 118, the routing information contained in the upstream optical signal transmitted as the optical packet signal.

The bandwidth of the memory used as the temporary storage register 116 or the data buffer 118 needs to be at least 10 Gbps; here, a commercially available memory, for example, with a DDR (Double Data Rate) of 266 MHz, will suffice for the purpose.

The multi-rate-receive/fixed-rate-transmit transponder 11 further includes an oscillator 121 which outputs a clock signal corresponding to the fixed bit rate of 40 Gbps, a baseband signal generating unit 120 which generates a baseband signal by reading out the original code sequence from the data buffer 118 at the frequency of the clock signal output from the oscillator 121 and by adding to it the routing information extracted by the routing information extraction unit 119, a light source 122 which produces carrier light for the inter-base-station optical signal, a modulator 123 which generates the inter-base-station optical signal by modulating the carrier light with the baseband signal generated by the baseband signal generating unit 120, and a communication control unit 124.

The light source 122 may be constructed from a laser diode or the like that produces laser light, for example, at the 1.5-μm band.

The communication control unit 124 performs control such as synchronization for the switching operation of the optical burst signal switch 14. When a synchronous signal indicating that the optical burst signal switch 14 is ready to perform the switching operation is received from the routing controller 15, the communication control unit 124 gives permission to the baseband signal generating unit 120 to generate the baseband signal.

When the inter-base-station optical signal is not an optical packet signal, the communication control unit 124 delivers the routing information extracted by the routing information extraction unit 119 to the routing controller 15 depicted in FIG. 3, thus providing the routing information for the optical burst signal output from the modulator 123.

Figure 5:
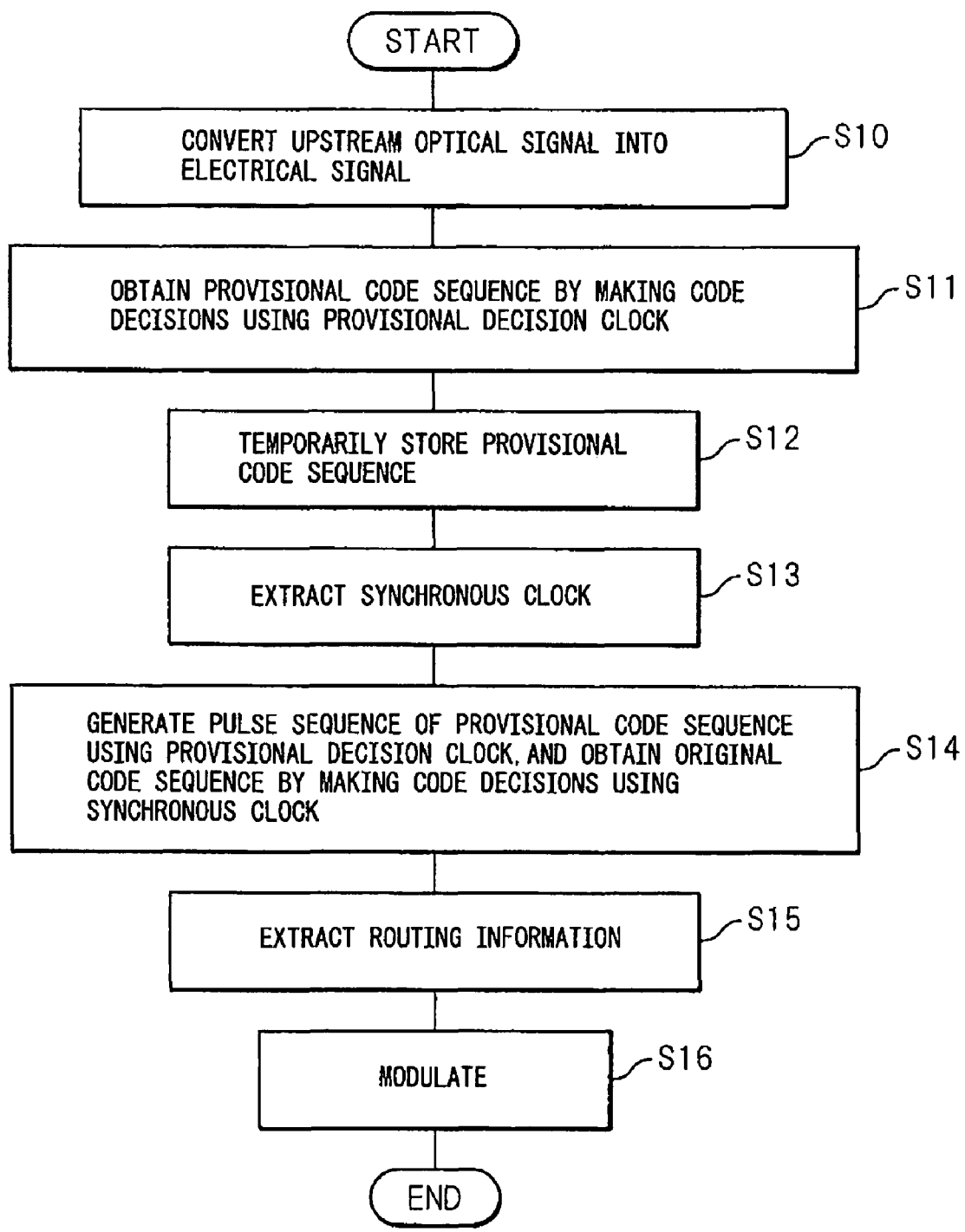
FIG. 5 is a flowchart illustrating a first example of an upstream optical signal conversion method according to the embodiment of the present invention.

FIG. 5 is a flowchart illustrating a first example of an upstream optical signal conversion method according to the embodiment of the present invention.

In step S10, the photodetector 111 converts the upstream optical signal received from the WDM coupler 13 into an electrical received signal.

In step S11, the code decision circuit 115 obtains the provisional code sequence by making code decisions on the electrical received signal at the frequency of the provisional decision clock output from the oscillator 114.

As earlier described, the provisional decision clock is a clock corresponding to the highest bit rate of 10 Gbps among the upstream bit rates of 1.25 Gbps, 2.5 Gbps, and 10 Gbps that the optical network units O11 to O13 respectively use. Accordingly, when the bit rate of the received upstream optical signal is 10 Gbps, the provisional code sequence obtained by the code decision circuit 115 is identical to the original code sequence. On the other hand, when the bit rate of the received upstream optical signal is 2.5 Gbps, the provisional code sequence has a code sequence length four times that of the original code sequence. Likewise, when the bit rate of the received upstream optical signal is 1.25 Gbps, the provisional code sequence has a code sequence length eight times that of the original code sequence.

In step S12, the provisional code sequence is temporarily stored in the temporary storage register 116.

In step S13, the synchronous clock extraction unit 112 extracts the synchronous clock which is the clock signal corresponding to the bit rate of the received upstream optical signal.

In step S14, the code re-decision circuit 117 regenerates the original code sequence by correcting the code sequence length of the provisional code sequence temporarily stored in the temporary storage register 116. Here, the code re-decision circuit 117 reads out the provisional code sequence from the temporary storage register 116, for example, at the frequency of the provisional decision clock. Then, by reading the thus obtained signal sequence at the frequency of the synchronous clock, the code re-decision circuit 117 can regenerate the signal sequence identical to the original code sequence.

In this embodiment, the upstream optical signal whose bit rate is unknown is encoded by using the provisional decision clock with a fixed bit rate, and temporarily stored in the temporary storage register 116; then, the original code sequence is regenerated by applying a correction using the synchronous clock. This serves to relax the speed requirements for the synchronous clock acquisition operation of the synchronous clock extraction unit 112. The original signal sequence obtained by the code re-decision circuit 117 is stored in the data buffer 118.

In step S15, the routing information extraction unit 119 extracts, from the original code sequence stored in the data buffer 118, the routing information contained in the upstream optical signal transmitted as the optical packet signal.

In step S16, the baseband signal generating unit 120 generates the baseband signal by reading out the original code sequence from the data buffer 118 at the frequency of the clock signal output from the oscillator 121 and by adding to it the routing information extracted by the routing information extraction unit 119. Then, the modulator 123 generates the inter-base-station optical signal by modulating the carrier light from the light source 122 with the baseband signal.

For the provisional decision clock that the code decision circuit 115 uses for the code decision, use may be made not only of the clock corresponding to the highest of the upstream bit rates, but also of a clock corresponding to a bit rate equal to an integral multiple of the highest of the upstream bit rates.

Figure 6:
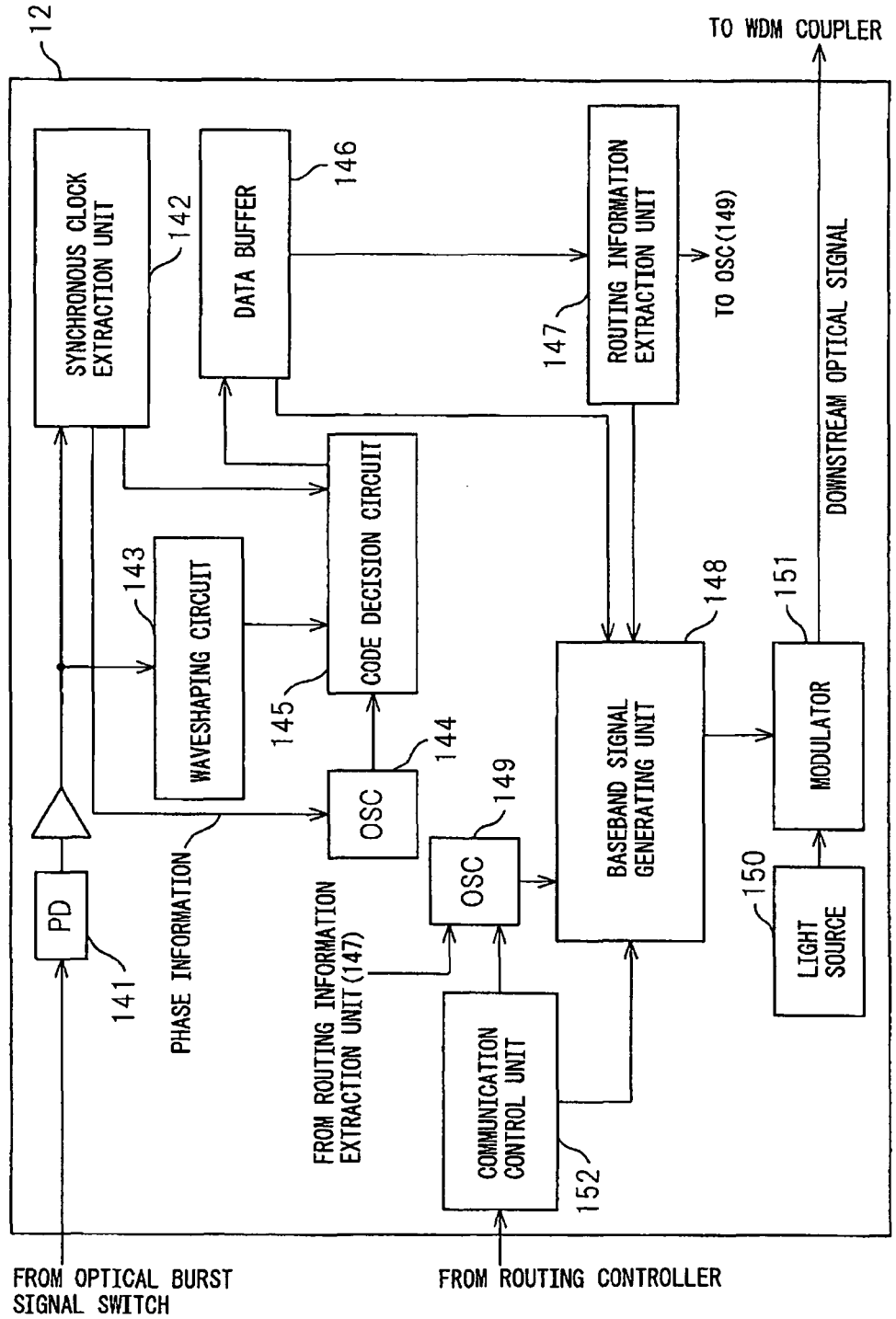
FIG. 6 is a diagram illustrating a first configuration example of a fixed-rate-receive/multi-rate-transmit transponder depicted in FIG. 3.

FIG. 6 is a diagram illustrating a first configuration example of the fixed-rate-receive/multi-rate-transmit transponder 12 depicted in FIG. 3.

The fixed-rate-receive/multi-rate-transmit transponder 12 includes a photodetector (PD) 141 which converts the inter-base-station signal received from the optical burst signal switch 14 depicted in FIG. 3 into an electrical received signal, a synchronous clock extraction unit 142 which extracts a synchronous clock from the electrical received signal, a waveshaping circuit 143 which performs waveshaping on the electrical received signal output from the photodetector 141, an oscillator 144 which generates a code decision clock having the same speed as the synchronous clock that the synchronous clock extraction unit 142 outputs, a code decision circuit 145 which makes code decisions on the electrical received signal at the frequency of the code decision clock, and a data buffer 146 for storing a code sequence obtained as a result of the code decisions made by the code decision circuit 145.

The fixed-rate-receive/multi-rate-transmit transponder 12 further includes a routing information extraction unit 147 which extracts, from the code sequence stored in the data buffer 146, the routing information contained in the inter-base-station signal when the inter-base-station signal is an optical packet signal.

The fixed-rate-receive/multi-rate-transmit transponder 12 further includes an oscillator 149 which outputs a clock signal corresponding to the operating bit rate of the optical network unit designated from among the optical network units O11 to O13 as the destination by the routing information extracted by the routing information extraction unit 147, a baseband signal generating unit 148 which generates a baseband signal by reading out the code sequence from the data buffer 146 at the frequency of the clock signal output from the oscillator 149 and by adding to it the routing information extracted by the routing information extraction unit 147, a light source 150 which produces carrier light for the inter-base-station optical signal, and a modulator 151 which generates the downstream optical signal by modulating the carrier light with the baseband signal generated by the baseband signal generating unit 148. The light source 150 may be constructed from a laser diode or the like that produces laser light, for example, at the 1.49-μm band.

Like the downstream optical signal in the prior art PON system, the downstream optical signal is a continuous signal having time slots periodically allocated to each of the optical network units O11 to O13. The baseband signal generating unit 148 identifies the destination optical network unit based on the routing information supplied from the routing information extraction unit 147, and outputs the baseband signal for modulating the downstream signal to be transmitted to the corresponding optical network unit, within the time slot period allocated to the optical network unit. A table that stores mapping between the address of each optical network unit and the time slot number allocated to each optical network unit may be provided in the baseband signal generating unit 148 so that the period during which to output the baseband signal can be determined from the destination address obtained from the routing information.

When the inter-base-station optical signal is not an optical packet signal, control information for the inter-base-station optical signal is supplied from the routing controller 15 depicted in FIG. 3 to the baseband signal generating unit 148 and the oscillator 149 via a communication control unit 152.

Figure 7:
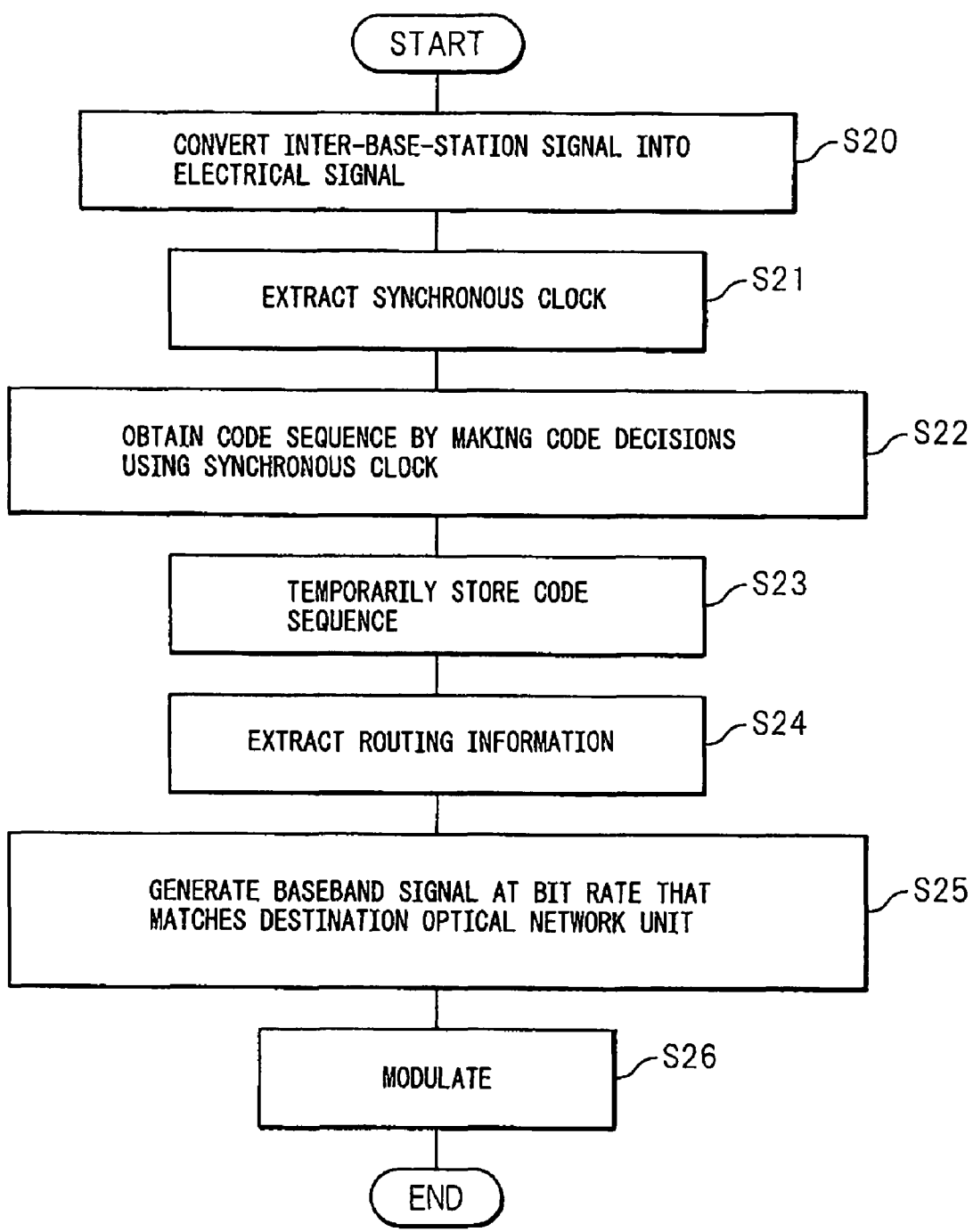
FIG. 7 is a flowchart illustrating a first example of an inter-base-station optical signal conversion method according to the embodiment of the present invention.

FIG. 7 is a flowchart illustrating a first example of an inter-base-station optical signal conversion method according to the embodiment of the present invention.

In step S20, the photodetector 141 converts the inter-base-station optical signal received from the optical burst signal switch 14 into an electrical received signal.

In step S21, the synchronous clock extraction unit 142 extracts the synchronous clock which is the clock signal corresponding to the bit rate of the received inter-base-station optical signal.

In step S22, the code decision circuit 145 obtains the code sequence by making code decisions on the electrical received signal at the frequency of the decision clock output from the synchronous clock extraction unit 142. In step S23, the code sequence is temporarily stored in the data buffer 146.

In step S24, the routing information extraction unit 147 extracts the routing information contained in the inter-base-station signal from the code sequence stored in the data buffer 146.

In step S25, the oscillator 149 generates a clock signal corresponding to the operating bit rate of the optical network unit designated as the destination by the routing information extracted by the routing information extraction unit 147.

The baseband signal generating unit 148 generates the baseband signal by reading out the code sequence from the data buffer 146 at the frequency of the clock generated by the oscillator 149 and by adding to it the routing information extracted by the routing information extraction unit 147. At this time, the baseband signal generating unit 148 identifies the destination optical network unit based on the routing information, and outputs the baseband signal for modulating the downstream signal to be transmitted to the corresponding optical network unit, within the time slot period allocated to the optical network unit.

In step S26, the modulator 151 generates the downstream optical signal by modulating the carrier light from the light source 150 with the baseband signal.

Figure 8:
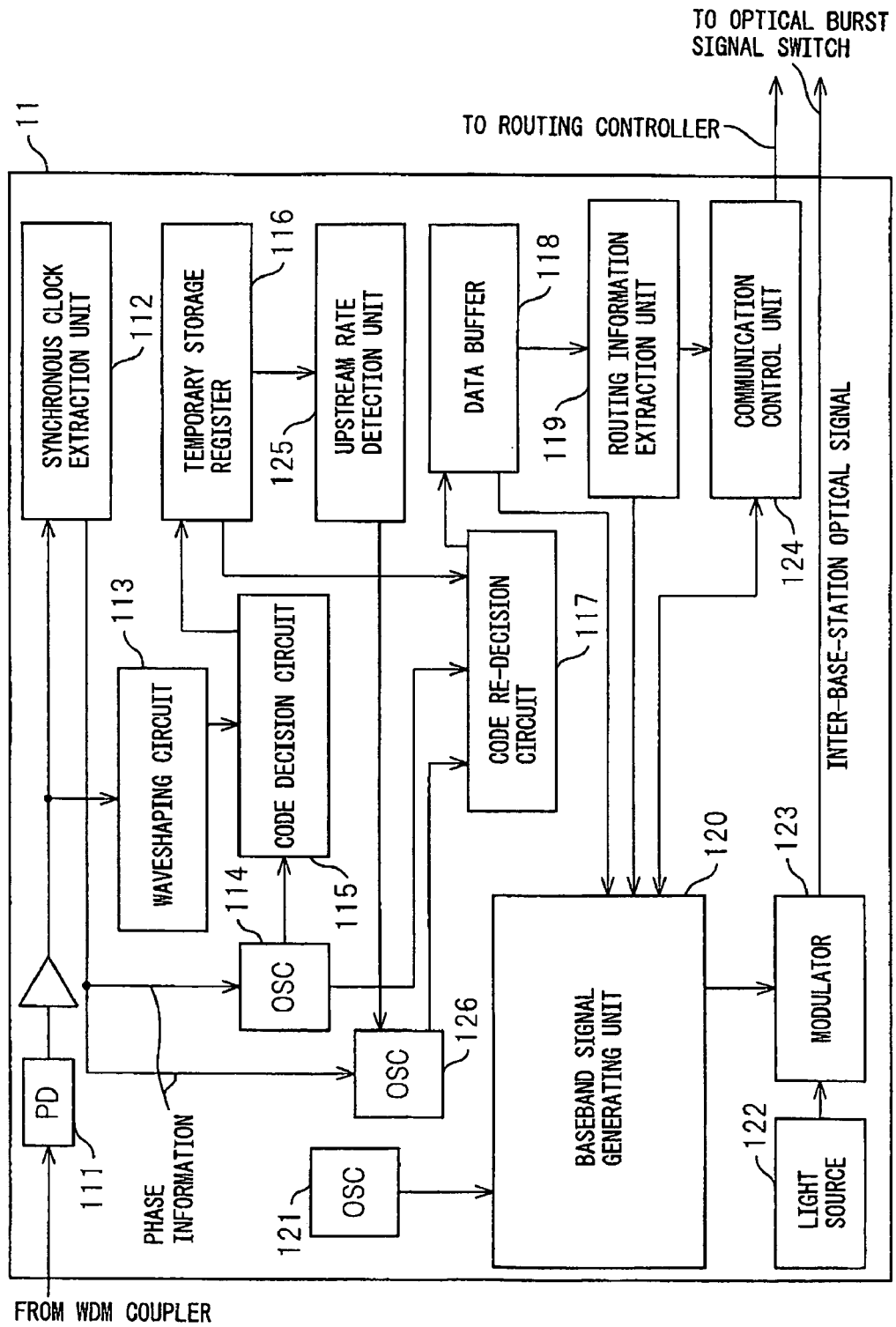
FIG. 8 is a diagram illustrating a second configuration example of the multi-rate-receive/fixed-rate-transmit transponder depicted in FIG. 3.

FIG. 8 is a diagram illustrating a second configuration example of the multi-rate-receive/fixed-rate-transmit transponder 11 depicted in FIG. 3. The multi-rate-receive/fixed-rate-transmit transponder 11 illustrated in FIG. 8 is similar in configuration to the multi-rate-receive/fixed-rate-transmit transponder described with reference to FIG. 4, and the same component elements are designated by the same reference numerals.

The embodiment illustrated here includes an upstream rate detection unit 125 which detects the upstream bit rate, i.e., the bit rate of the upstream optical signal transferred from the WDM coupler, and an oscillator 126 which generates a clock signal corresponding to the upstream bit rate detected by the upstream rate detection unit 125.

Figure 9:
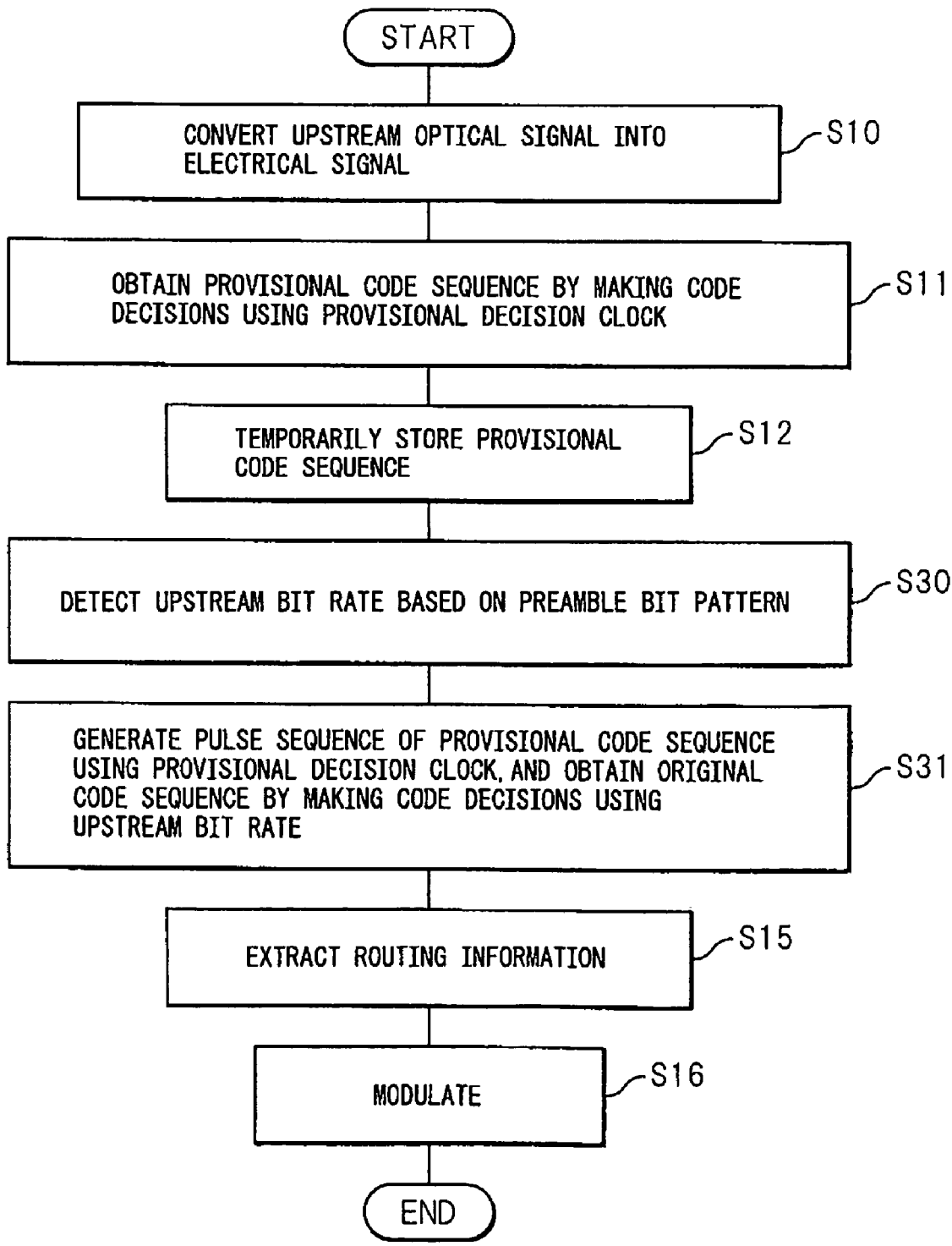
FIG. 9 is a flowchart illustrating a second example of the upstream optical signal conversion method according to the embodiment of the present invention.

FIG. 9 is a flowchart illustrating a second example of the upstream optical signal conversion method according to the embodiment of the present invention. In steps S10 to S12, the provisional code sequence is generated using the provisional decision clock, and the provisional code sequence is temporarily stored in the temporary storage register 116, as in the method depicted in FIG. 5.

In step S30, the upstream bit rate is detected based on the bit pattern of the provisional code sequence generated from the preamble portion of the upstream optical signal transferred from the WDM coupler 13.

Figure 10:
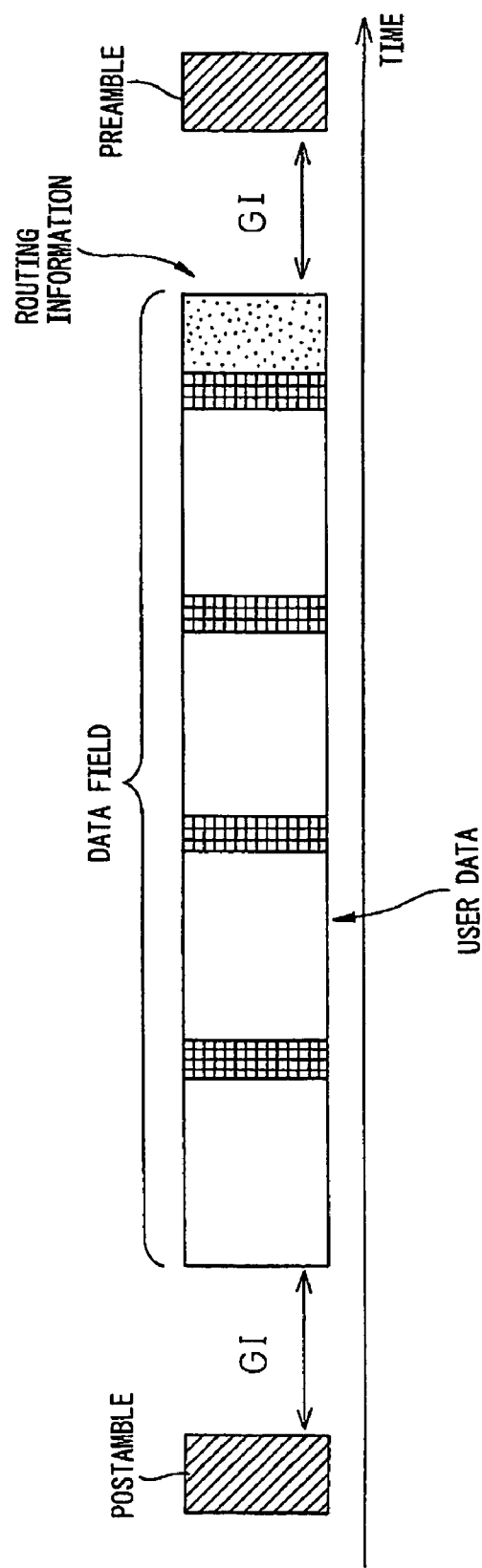
FIG. 10 is a diagram illustrating the format of the optical signal transmitted from each optical network unit to the base station.

FIG. 10 is a diagram illustrating the format of the optical signal transmitted from each of the optical network units O11 to O13 to the base station BS1.

The data field in FIG. 10 carries the routing information and user data. A preamble signal and a postamble signal are placed before and after the data field by inserting a prescribed guard time (GI) on each side thereof. The preamble portion contains bit rate notification information from each optical network unit, while the postamble portion contains data indicating the end of the data. The preamble portion carries a fixed data pattern, and this fixed data pattern is modulated at a bit rate specific to each individual optical network unit.

Figure 11:
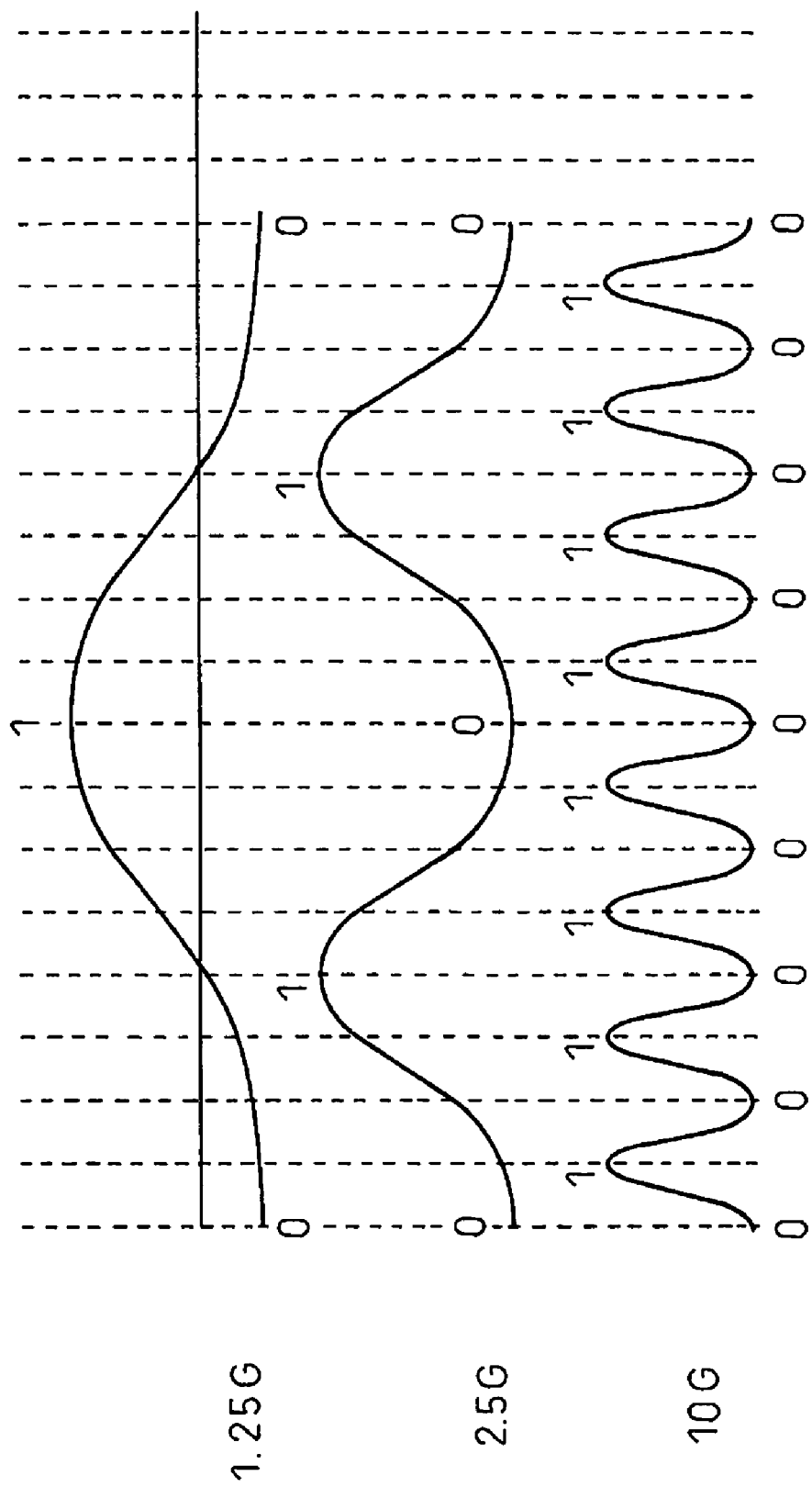
FIG. 11 is a diagram illustrating the signal carried in a preamble portion depicted in FIG. 10.

FIG. 11 is a diagram illustrating the signal carried in the preamble portion depicted in FIG. 10. In the illustrated example, a signal sequence "1010 . . . " in which a value "1" alternates with a value "0" is used as the fixed data pattern carried in the preamble portion. Signals produced by modulating this data pattern at the respective bit rates of 1.25 G, 2.5 G, and 10 G are depicted in FIG. 11.

FIG. 12A illustrates the relationship between the timing for the code decision circuit 115 depicted in FIG. 8 to make code decisions using the provisional decision clock and the respective preamble signals depicted in FIG. 11. Dashed lines in the figure indicate code decision timing instants.

Figure 12B:
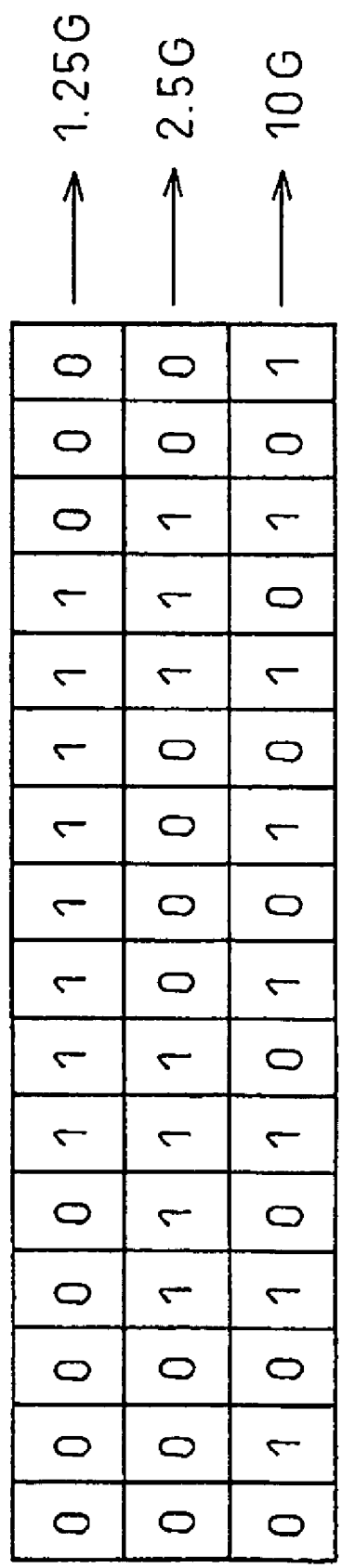
FIG. 12B is a diagram illustrating provisional code sequences generated by encoding with the code decision timing instants indicated in FIG. 12A.

FIG. 12B is a diagram illustrating the provisional code sequences generated by encoding the respective preambles at the code decision timing instants indicated in FIG. 12A. As illustrated, in the provisional code sequence in the preamble portion, the number of successive data elements of the same values differs according to the bit rate used. The upstream rate detection unit 125 depicted in FIG. 8 can therefore detect the bit rate used for the upstream optical signal, by counting the number of successive data elements of the same values appearing in the provisional code sequence.

In step S31 of FIG. 9, the oscillator 126 generates the clock signal corresponding to the upstream bit rate detected by the upstream rate detection unit 125.

The code re-decision circuit 117 regenerates the signal sequence identical to the original code sequence by reading, at the frequency of the clock generated by the oscillator 126, the signal sequence obtained by reading out the provisional code sequence from the temporary storage register 116 at the frequency of the provisional decision clock.

In steps S15 and S16, the baseband signal is generated, and the carrier light is modulated with the baseband signal, as in the method depicted in FIG. 5.

If the electronic circuit forming the upstream rate detection unit 125 is fast enough, the upstream bit rate may be detected during the guard time that follows the preamble portion and, in the succeeding data field, code decisions may be made directly by using the upstream bit rate detected during the guard time, without generating the provisional code sequence. Further, a known bit pattern other than the signal sequence "1010 . . . " may be used as the bit pattern in the preamble portion.

Figure 13:
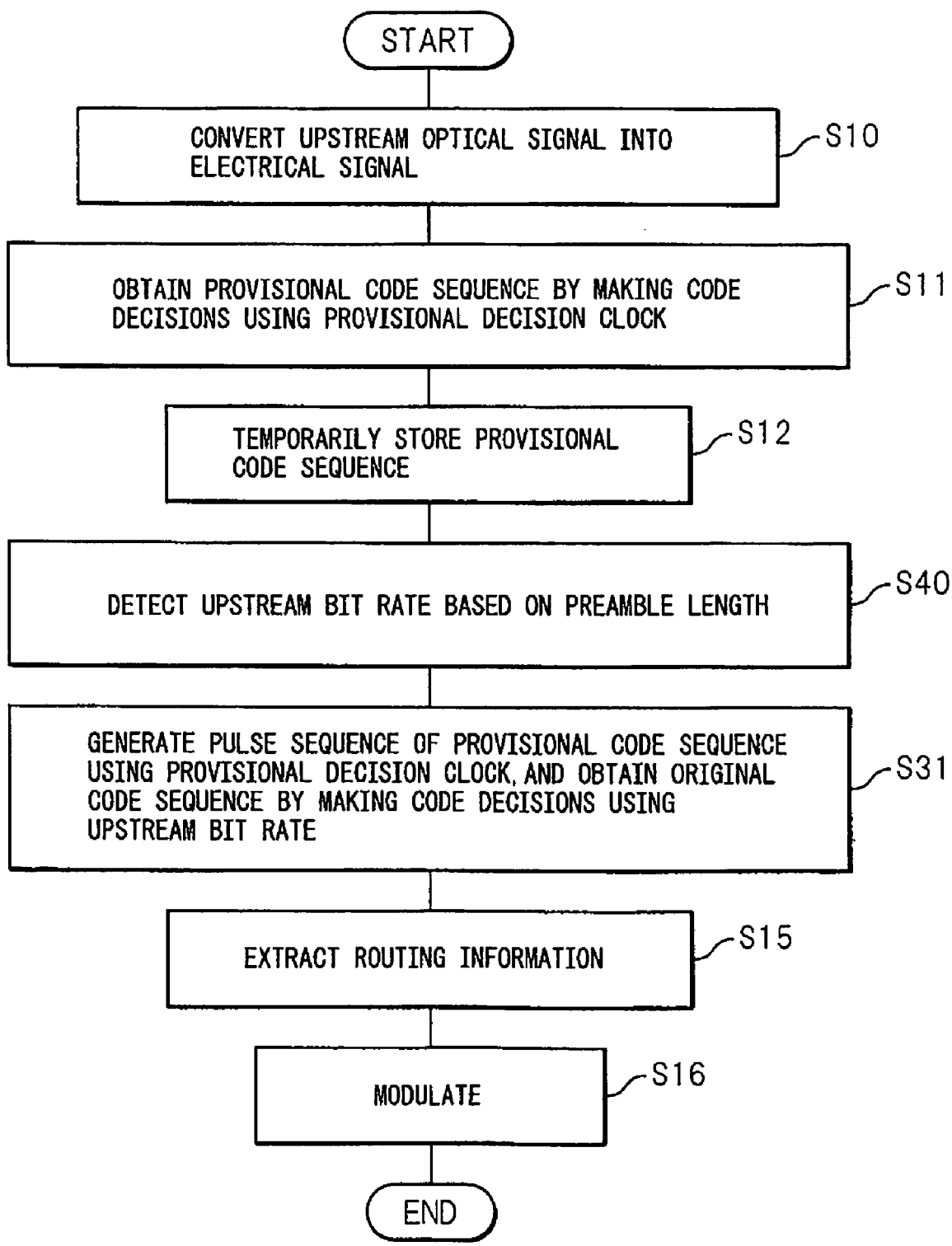
FIG. 13 is a flowchart illustrating a third example of the upstream optical signal conversion method according to the embodiment of the present invention.

FIG. 13 is a flowchart illustrating a third example of the upstream optical signal conversion method according to the embodiment of the present invention. In this method, the upstream rate detection unit 125 detects the upstream bit rate based on the receiving time of the preamble portion, i.e., the data length of the provisional code sequence generated by sampling the preamble portion using the provisional decision clock of the fixed frequency.

In steps S10 to S12, the provisional code sequence is generated using the provisional decision clock, and the provisional code sequence is temporarily stored in the temporary storage register 116, as in the method depicted in FIG. 9.

Figure 14:
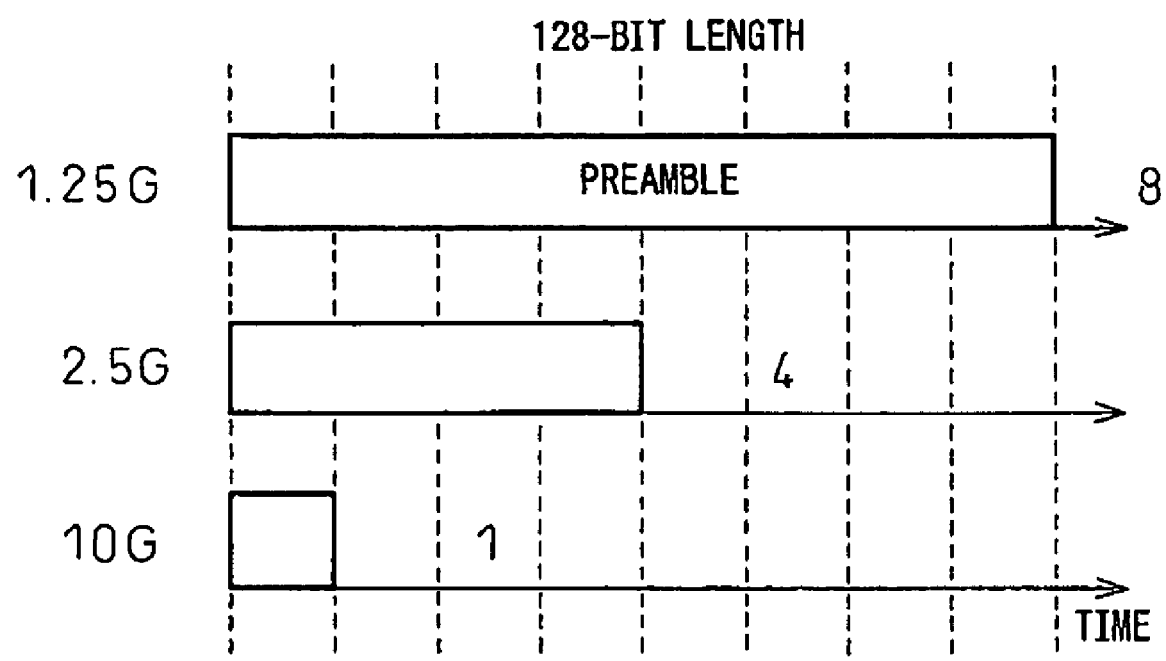
FIG. 14 is a diagram illustrating the relationship between bit rate and preamble length.

In step S40, the upstream rate detection unit 125 detects the upstream bit rate based on the receiving time of the preamble portion. FIG. 14 is a diagram illustrating the relationship between the bit rate and the preamble length. As can be seen, when a preamble of a fixed bit length is transmitted from each optical network unit, the data length increases as the bit rate decreases. For example, in the case of a preamble of a 128-bit fixed length, the preamble signal from the 1.25-Gbps optical network unit is eight times as long as the preamble signal from the 10-Gbps optical network unit.

The upstream rate detection unit 125 can thus detect the bit rate of the upstream optical signal based on the data length of the preamble portion sandwiched between the guard intervals.

In steps S31, S15, and S16, the original code sequence is generated, the baseband signal is generated, and the carrier light is modulated with the baseband signal, as in the method depicted in FIG. 9.

Figure 15:
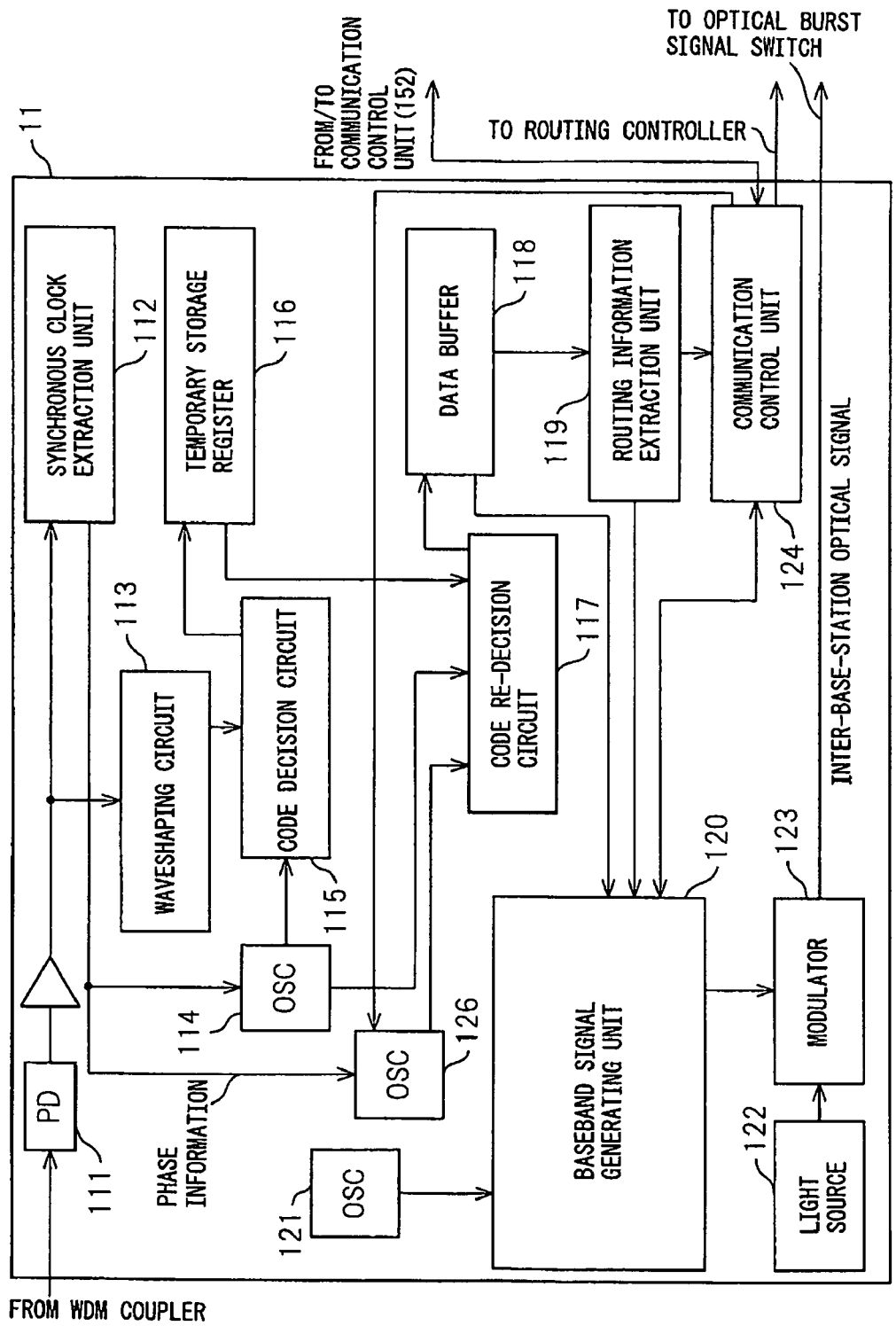
FIG. 15 is a diagram illustrating a third configuration example of the multi-rate-receive/fixed-rate-transmit transponder depicted in FIG. 3.
Figure 16:
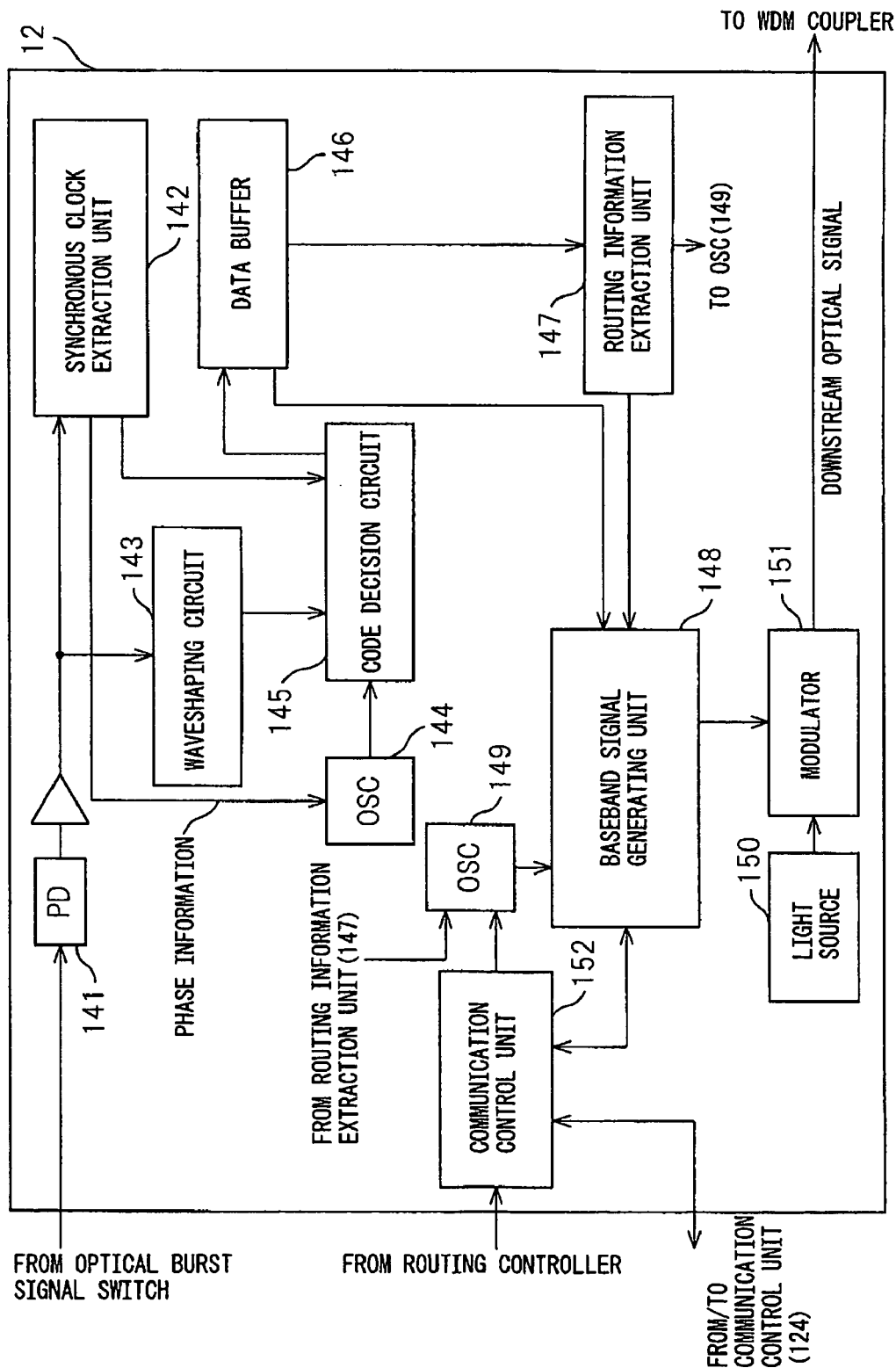
FIG. 16 is a diagram illustrating a second configuration example of the fixed-rate-receive/multi-rate-transmit transponder depicted in FIG. 3.

FIG. 15 is a diagram illustrating a third configuration example of the multi-rate-receive/fixed-rate-transmit transponder 11 depicted in FIG. 3, and FIG. 16 is a diagram illustrating a second configuration example of the fixed-rate-receive/multi-rate-transmit transponder 12 depicted in FIG. 3. The multi-rate-receive/fixed-rate-transmit transponder 11 illustrated in FIG. 15 and the fixed-rate-receive/multi-rate-transmit transponder 12 illustrated in FIG. 16 are similar in configuration to the multi-rate-receive/fixed-rate-transmit transponder described with reference to FIG. 4 and the fixed-rate-receive/multi-rate-transmit transponder described with reference to FIG. 6, respectively, and the same component elements are designated by the same reference numerals.

In the embodiment illustrated, the optical network units O11 to O13 do not transmit upstream optical signals on their own initiative, but transmit upstream optical signals only when a downstream optical signal is received from the OLT unit 10, as in the ping-pong transmission scheme employed in the prior art PON system.

Accordingly, the OLT unit 10 knows to which of the optical network units O11 to O13 the downstream optical signal has been transmitted, and thus has prior knowledge of the bit rate that the corresponding one of the optical network units O11 to O13 uses for transmission. The OLT unit 10 can also estimate the period of time that elapses from the moment the downstream optical signal is transmitted to the optical network unit until the upstream signal is received from that optical network unit.

As a result, the base station BS1 can identify the bit rate of the arriving upstream optical signal without having to receive bit rate information from the corresponding one of the optical network units O11 to O13. Accordingly, in this embodiment, the communication control unit 152 provided in the fixed-rate-receive/multi-rate-transmit transponder 12 that transmits the downstream optical signal delivers information concerning the identifier of the optical network unit designated as the destination of the downstream optical signal, or the bit rate the optical network unit uses for operation, to the communication control unit 124 provided in the multi-rate-receive/fixed-rate-transmit transponder 11 that receives the upstream optical signal.

Figure 17:
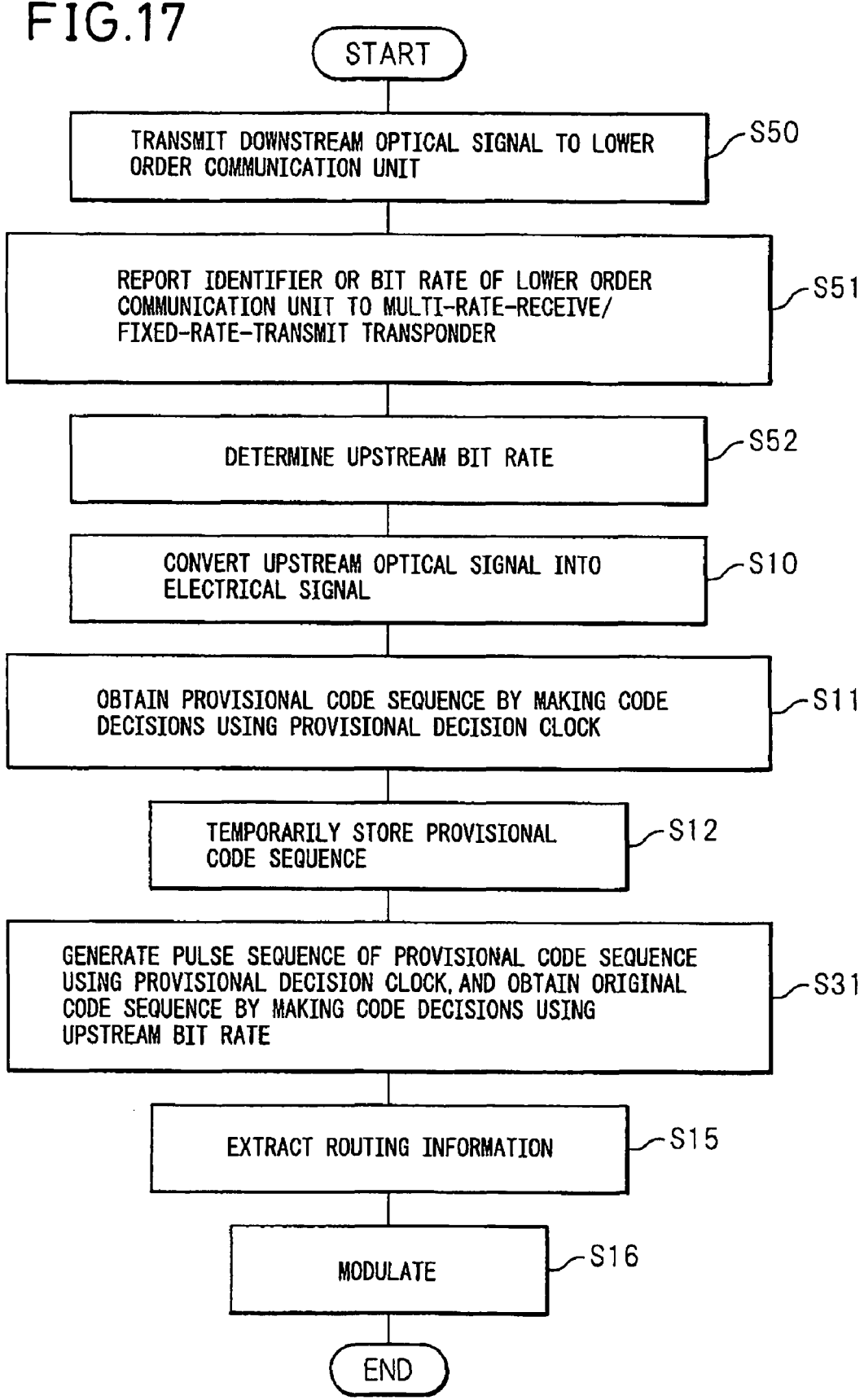
FIG. 17 is a flowchart illustrating a fourth example of the upstream optical signal conversion method according to the embodiment of the present invention.

FIG. 17 is a flowchart illustrating a fourth example of the upstream optical signal conversion method according to the embodiment of the present invention.

In step S50, the fixed-rate-receive/multi-rate-transmit transponder 12 transmits a downstream optical signal to a designated one of the optical network units O11 to O13.

In step S51, the baseband signal generating unit 148 provided in the fixed-rate-receive/multi-rate-transmit transponder 12 notifies the communication control unit 152 of the identifier of the destination optical network unit of the downstream optical signal currently being transmitted or the bit rate of the baseband signal currently being generated.

The communication control unit 152 in the fixed-rate-receive/multi-rate-transmit transponder 12 delivers the identifier or bit rate of the optical network unit, reported from the baseband signal generating unit 148, to the communication control unit 124 provided in the multi-rate-receive/fixed-rate-transmit transponder 11.

In step S52, based on the identifier or bit rate of the optical network unit reported in step S51, the communication control unit 124 determines the bit rate of the upstream optical signal expected to arrive in a predetermined period of time after receipt of the identifier or bit rate.

When the information delivered in step S51 is the identifier of the optical network unit, the communication control unit 124 has a table that stores mapping between the identifier of each optical network unit and the upstream bit rate that each optical network unit uses. Then, the upstream bit rate corresponding to the reported identifier is retrieved from this table.

On the other hand, when the information reported in step S51 is the bit rate, the communication control unit 124 takes the reported bit rate directly as the upstream bit rate.

In steps S10 to S12, the provisional code sequence is generated using the provisional decision clock, and the provisional code sequence is temporarily stored in the temporary storage register 116, as in the method depicted in FIG. 9.

In steps S31, S15, and S16, using the upstream bit rate determined in step S52, the original code sequence is generated, the baseband signal is generated, and the carrier light is modulated with the baseband signal, as in the method depicted in FIG. 9.

Figure 18:
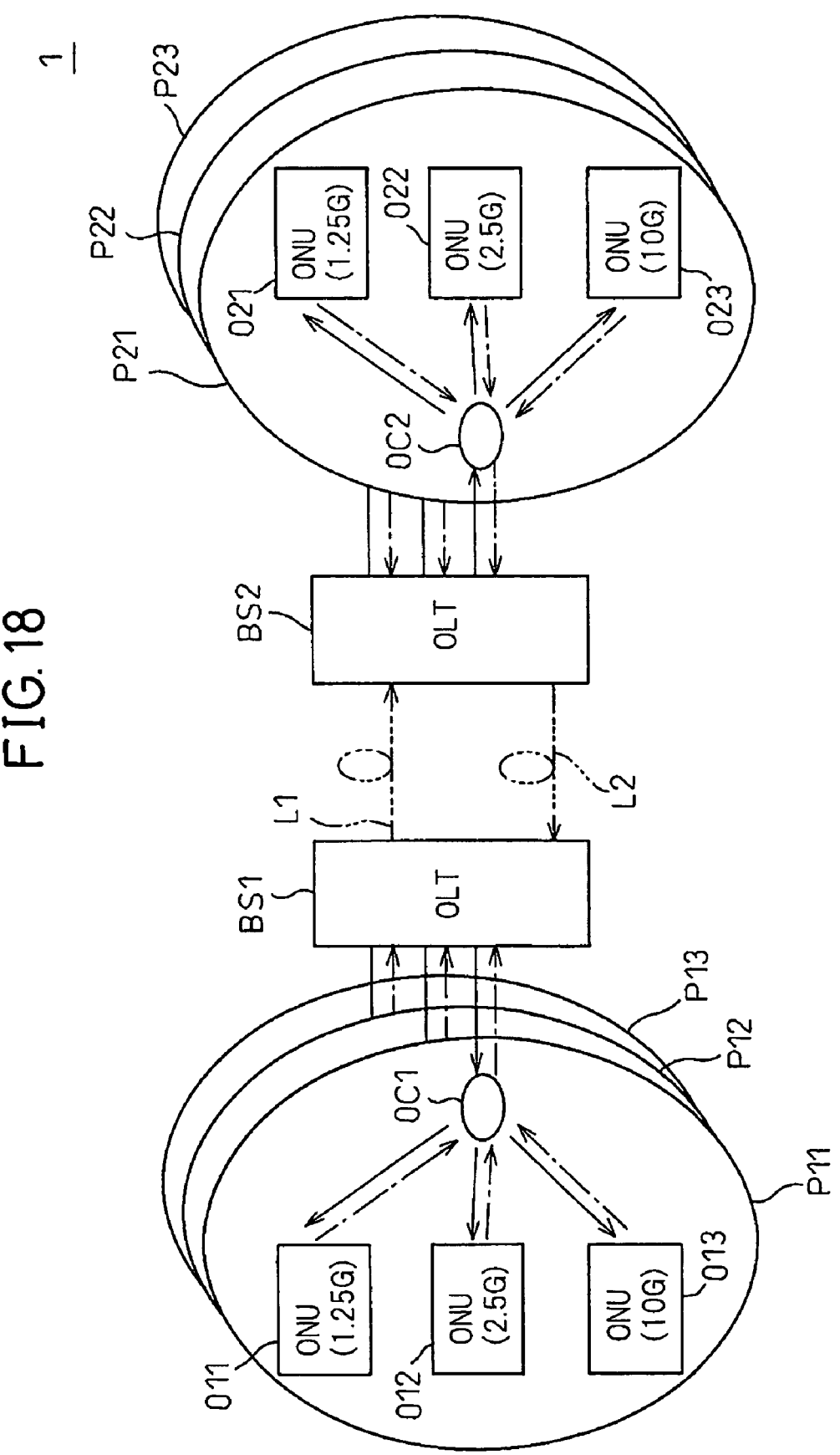
FIG. 18 is a diagram illustrating a second configuration example of the optical communication system according to the embodiment of the present invention.
Figure 19:
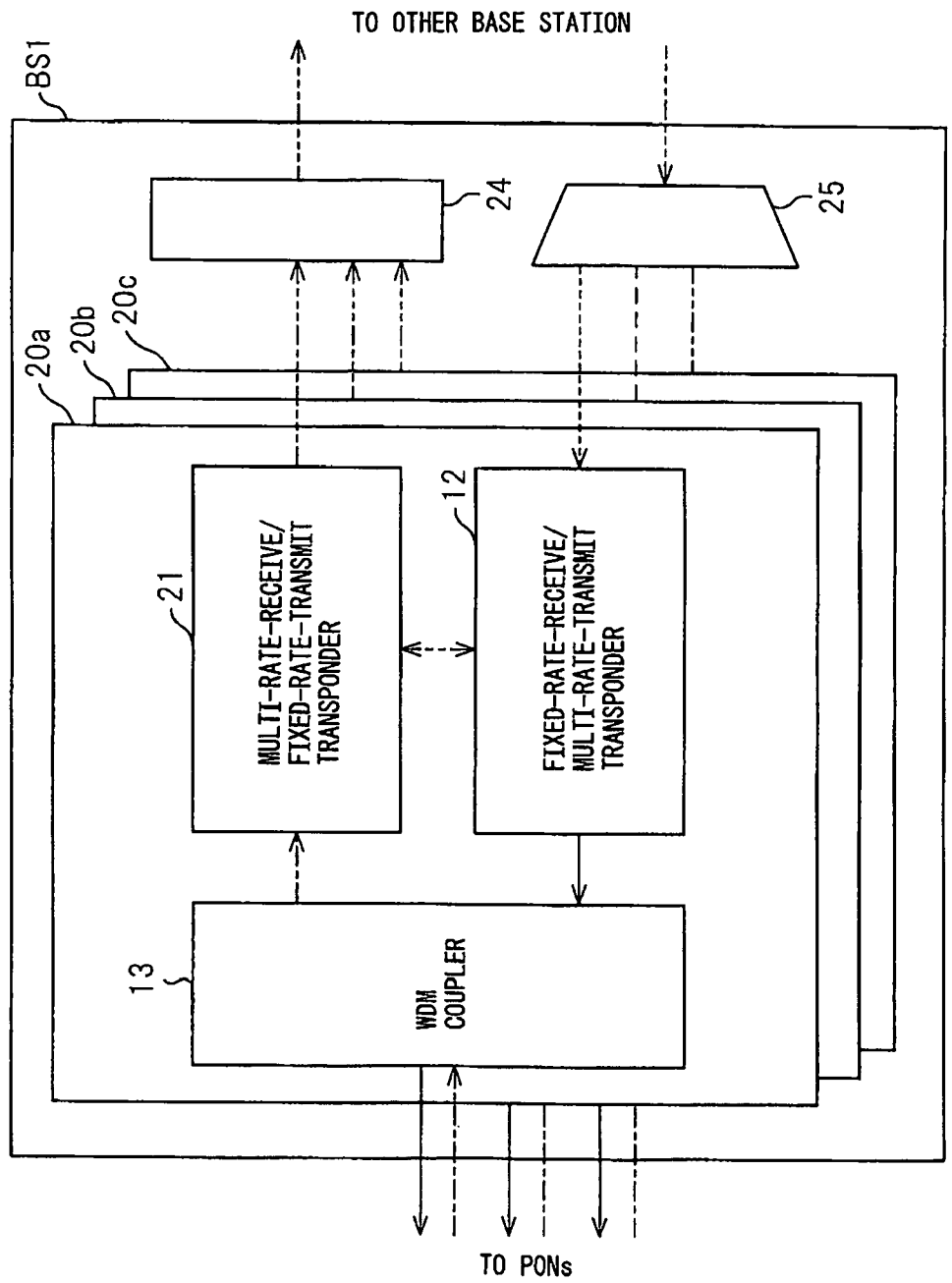
FIG. 19 is a diagram illustrating a configuration example of a base station depicted in FIG. 18.
Figure 20:
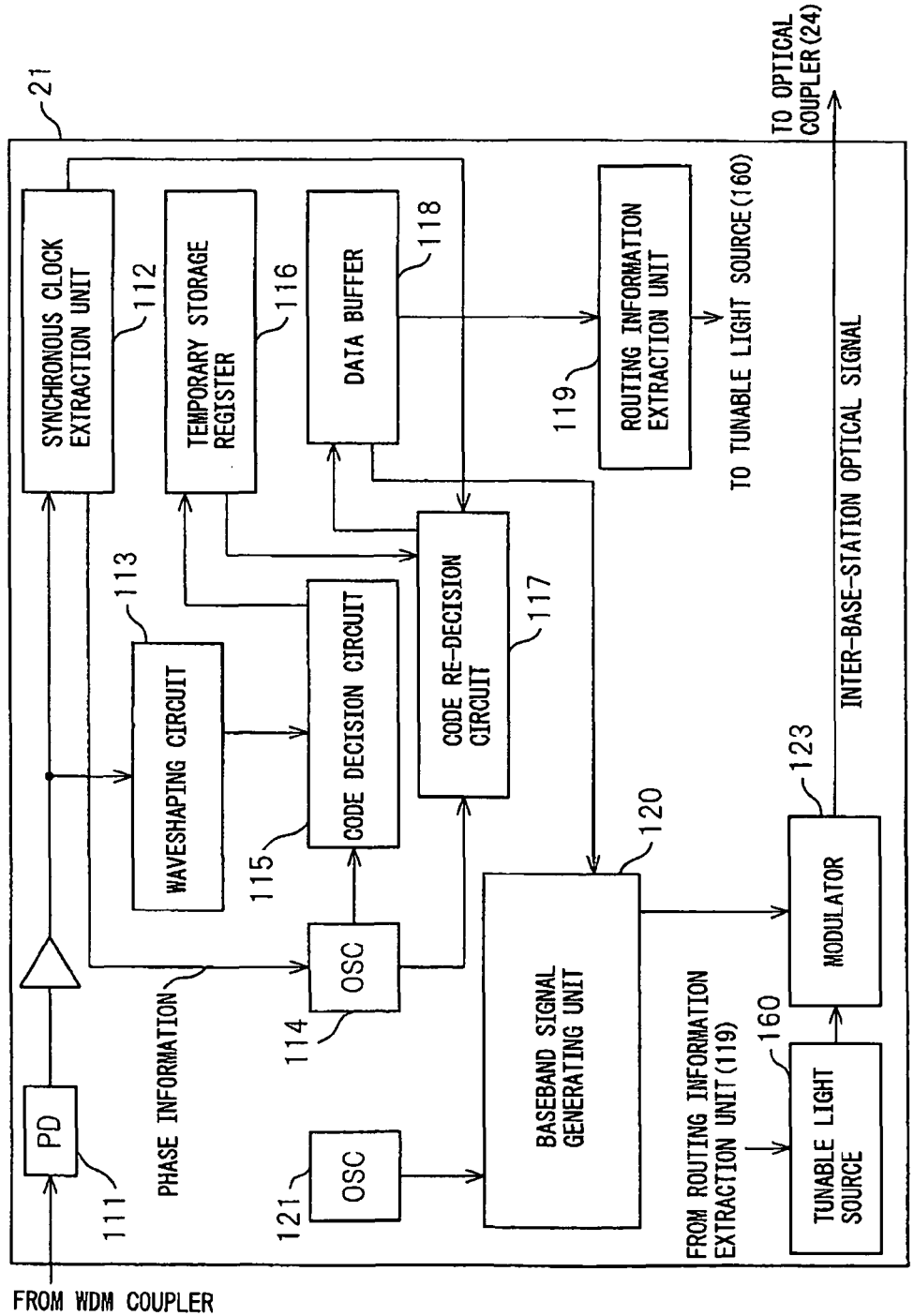
FIG. 20 is a diagram illustrating a first configuration example of a multi-rate-receive/fixed-rate-transmit transponder depicted in FIG. 19.

FIG. 18 is a diagram illustrating a second configuration example of the optical communication system according to the embodiment of the present invention, and FIG. 19 is a diagram illustrating a configuration example of the base station BS1 depicted in FIG. 18. Further, FIG. 20 is a diagram illustrating a first configuration example of a multi-rate-receive/fixed-rate-transmit transponder 21 depicted in FIG. 19.

In the embodiment illustrated, wavelength-division multiplexed communication is performed between the base stations BS1 and BS2 connected by optical fiber transmission lines L1 and L2, and the inter-base-station optical signal is transmitted by assigning a different wavelength to each PON system containing the destination optical network unit.

In this embodiment, since the wavelength of the inter-base-station optical signal is changed according to the PON system to which the destination optical network unit belongs, communication can be performed between optical network units belonging to any given PON systems, without having to use the optical burst signal switch as in the configuration example of the optical communication system depicted in FIG. 2.

For this purpose, the base station BS1 depicted in FIG. 19 includes OLT units 20*a* to 20*c* (hereinafter sometimes referred to collectively as the "OLT unit 20") as central office optical line terminals for the respective PON systems P11 to P13, an optical coupler 24 which combines optical signals of different wavelengths output from the multi-rate-receive/fixed-rate-transmit transponders 21 in the respective OLT units 20, and an optical splitter 25 which separates by wavelength the wavelength-division multiplexed signal received from the other base station.

Of the signals of different wavelengths carried in the wavelength-division multiplexed signal received from the other base station, only the signals of the wavelengths assigned to the respective PON systems P11 to P13 are separated by the optical splitter 25 and directed to the fixed-rate-receive/multi-rate-transmit transponders 12 provided for the respective PON systems P11 to P13.

As depicted in FIG. 20, each multi-rate-receive/fixed-rate-transmit transponder 21 includes a wavelength tunable light source 160.

The wavelength tunable light source 160 changes the wavelength of the carrier light according to the PON system to which belongs the optical network unit designated by the routing information extracted by the routing information extraction unit 119 as the destination of the optical burst signal that the multi-rate-receive/fixed-rate-transmit transponder 21 outputs. The multi-rate-receive/fixed-rate-transmit transponder 21 is similar in configuration to the multi-rate-receive/fixed-rate-transmit transponder illustrated in FIG. 4, and the same component elements are designated by the same reference numerals. The fixed-rate-receive/multi-rate-transmit transponder 12 depicted in FIG. 19 has the same configuration as the fixed-rate-receive/multi-rate-transmit transponder illustrated in FIG. 6.

Figure 21:
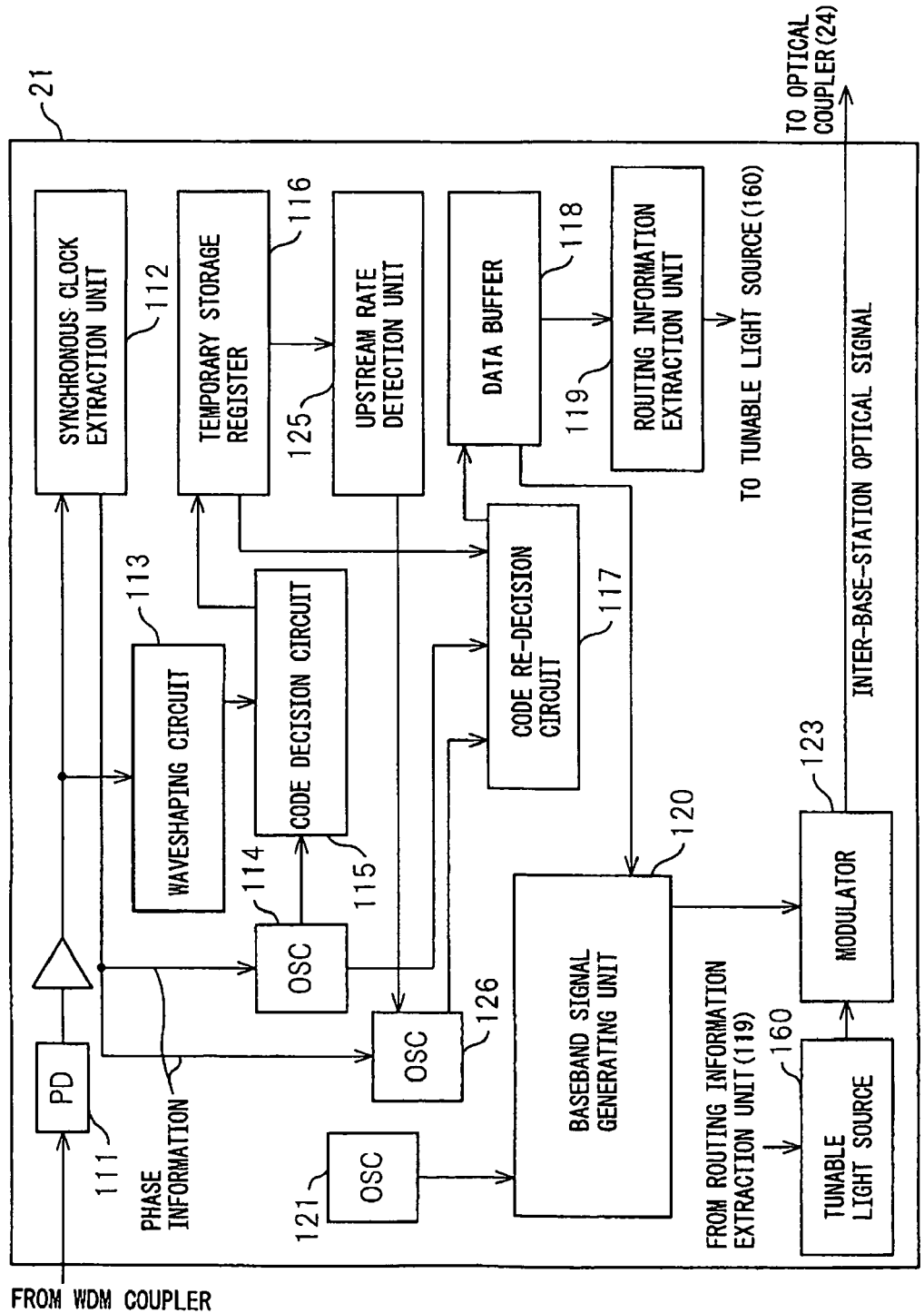
FIG. 21 is a diagram illustrating a second configuration example of the multi-rate-receive/fixed-rate-transmit transponder depicted in FIG. 19.

FIG. 21 is a diagram illustrating a second configuration example of the multi-rate-receive/fixed-rate-transmit transponder 21 depicted in FIG. 19. This configuration example includes an upstream rate detection unit and an oscillator which are respectively identical to the upstream rate detection unit 125 and the oscillator 126 in the multi-rate-receive/fixed-rate-transmit transponder illustrated in FIG. 8. The operation of the upstream rate detection unit 125 and the oscillator 126 is the same as the operation of the corresponding component elements described with reference to FIG. 8.

Figure 22:
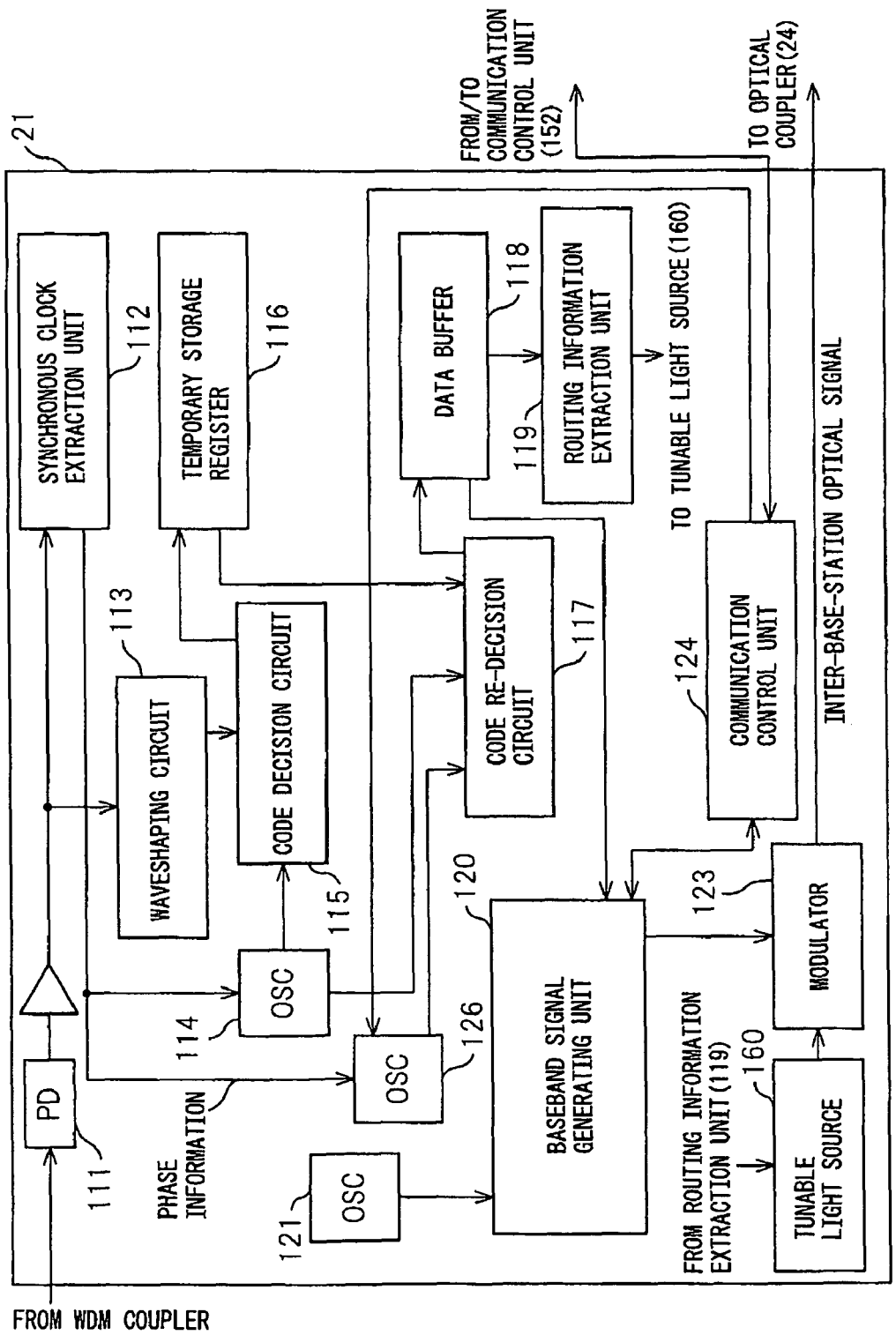
FIG. 22 is a diagram illustrating a third configuration example of the multi-rate-receive/fixed-rate-transmit transponder depicted in FIG. 19.

FIG. 22 is a diagram illustrating a third configuration example of the multi-rate-receive/fixed-rate-transmit transponder 21 depicted in FIG. 19. In this embodiment, as in the multi-rate-receive/fixed-rate-transmit transponder illustrated in FIG. 15, the communication control unit 124 receives information concerning the identifier of the optical network unit designated as the destination of the downstream optical signal, or the bit rate the optical network unit uses for operation, from the communication control unit 152 provided in the fixed-rate-receive/multi-rate-transmit transponder 12 illustrated in FIG. 16, and determines the upstream bit rate based on the received information.

Figure 23:
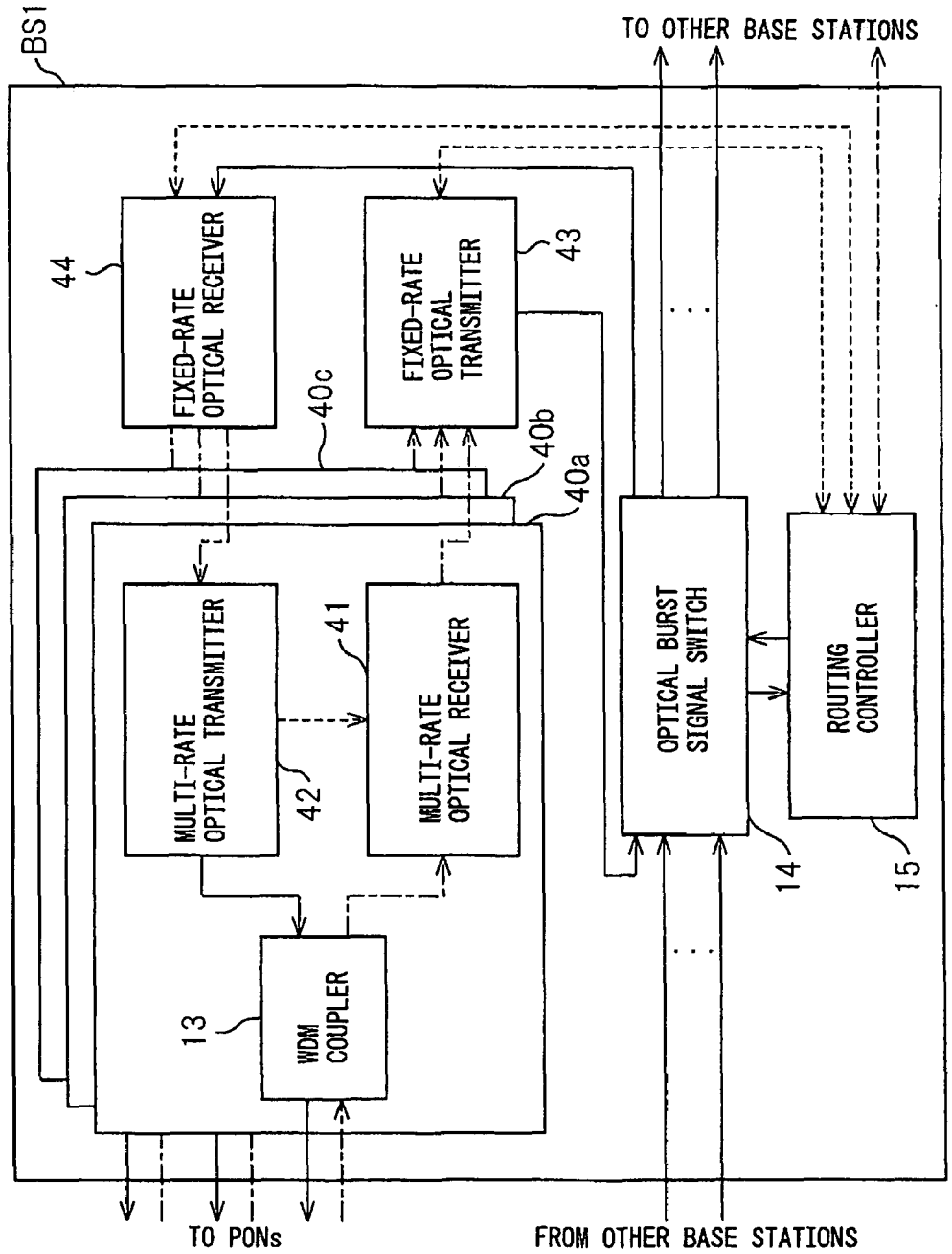
FIG. 23 is a diagram illustrating a second configuration example of the base station depicted in FIG. 2.

FIG. 23 is a diagram illustrating a second configuration example of the base station BS1 depicted in FIG. 2. In this configuration example, the multi-rate-receive/fixed-rate-transmit transponder 11 depicted in FIG. 3 is divided into two parts: a multi-rate optical receiver 41 which receives upstream optical signals of different bit rates and obtains a code sequence by making code decisions, and a fixed-rate optical transmitter 43 which modulates carrier light with the code sequence received from the multi-rate optical receiver 41 and generates and transmits an inter-base-station optical signal of a fixed bit rate for transmission.

The fixed-rate-receive/multi-rate-transmit transponder 12 is also divided into two parts: a fixed-rate optical receiver 44 which receives an inter-base-station optical signal of a fixed bit rate and obtains a code sequence by making code decisions, and a multi-rate optical transmitter 42 which modulates carrier light with the code sequence received from the fixed-rate optical receiver 44 and generates, for transmission, a downstream optical signal having a bit rate specific to each individual optical network unit.

The fixed-rate optical transmitter 43 and the fixed-rate optical receiver 44 are shared among the plurality of PON systems, i.e., among the plurality of OLT units 40a to 40c. Since the bit rate of the inter-base-station optical signal that the fixed-rate optical transmitter 43 and the fixed-rate optical receiver 44 each handle is higher than any bit rate that the multi-rate optical receiver 41 and the multi-rate optical transmitter 42 handle, the fixed-rate optical transmitter 43 and the fixed-rate optical receiver 44 can be shared among the plurality of PON systems, and by thus sharing them, the system can be constructed at a lower cost.

Figure 24:
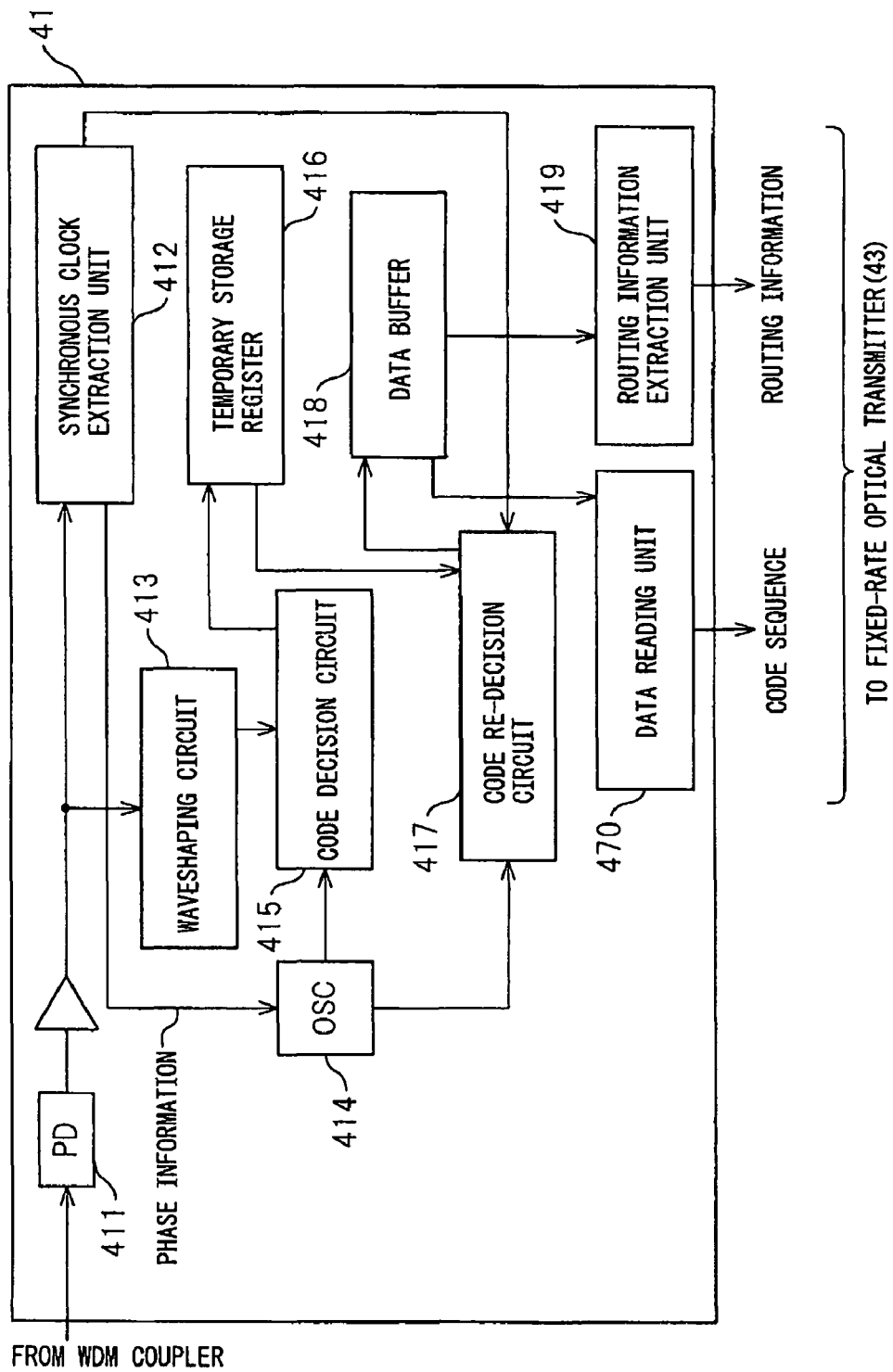
FIG. 24 is a diagram illustrating a first configuration example of a multi-rate optical receiver depicted in FIG. 23.

FIG. 24 is a diagram illustrating a first configuration example of the multi-rate optical receiver 41 depicted in FIG. 23. As illustrated, the multi-rate optical receiver 41 includes a photodetector 411, a synchronous clock extraction unit 412, a waveshaping circuit 413, an oscillator 414, a code decision circuit 415, a temporary storage register 416, a code re-decision circuit 417, a data buffer 418, and a routing information extraction unit 419.

The photodetector 411, the synchronous clock extraction unit 412, the waveshaping circuit 413, the oscillator 414, the code decision circuit 415, the temporary storage register 416, the code re-decision circuit 417, the data buffer 418, and the routing information extraction unit 419 respectively correspond to the photodetector 111, the synchronous clock extraction unit 112, the waveshaping circuit 113, the oscillator 114, the code decision circuit 115, the temporary storage register 116, the code re-decision circuit 117, the data buffer 118, and the routing information extraction unit 119 in the multi-rate-receive/fixed-rate-transmit transponder 11 described with reference to FIG. 4.

The multi-rate optical receiver 41 further includes a data reading unit 470 which reads the code sequence of the received signal from the data buffer 418. The data reading unit 470 and the routing information extraction unit 419 output the code sequence of the received signal and its routing information, respectively, to the fixed-rate optical transmitter 43.

Figure 25:
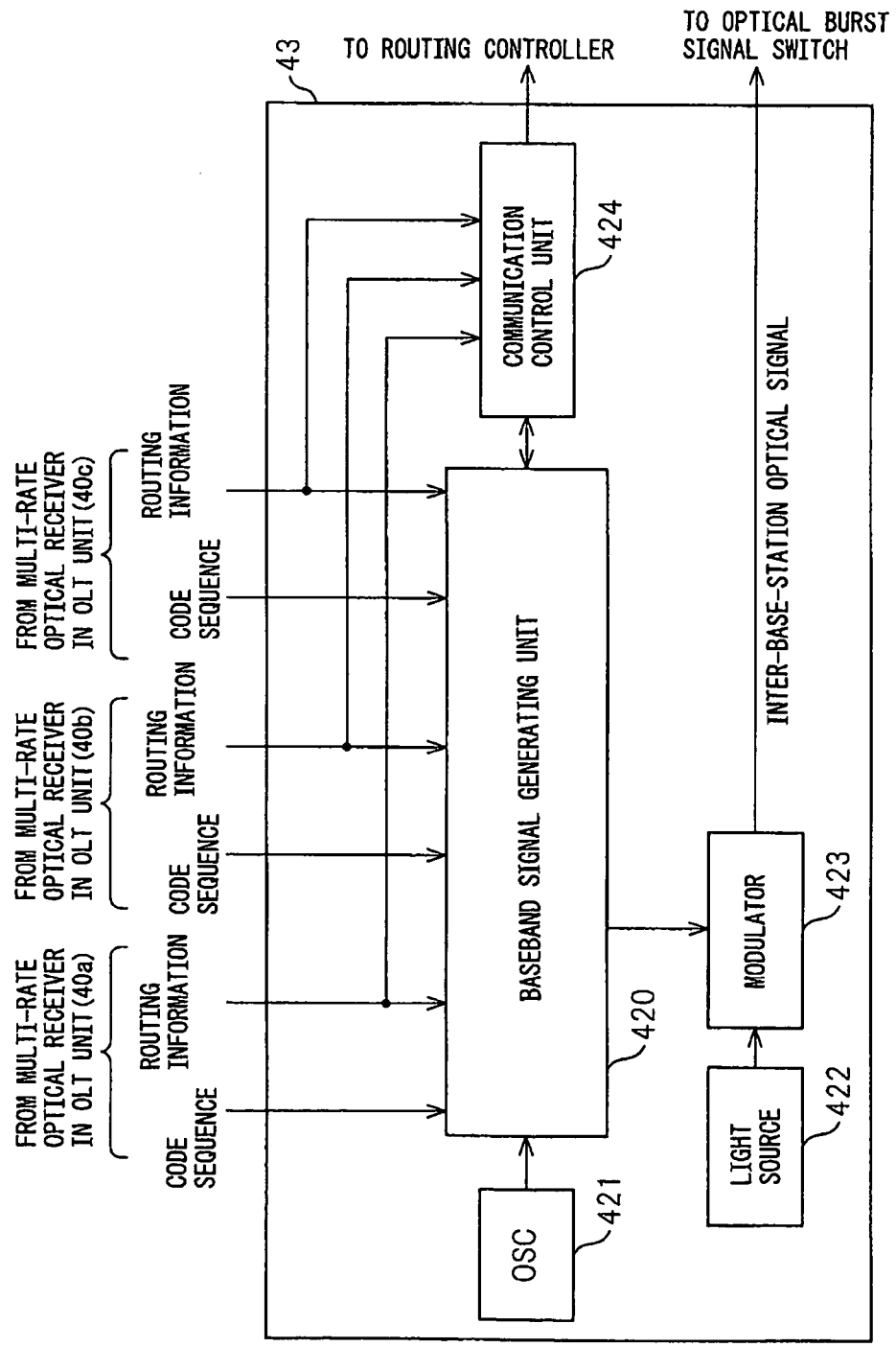
FIG. 25 is a diagram illustrating a configuration example of a fixed-rate optical transmitter depicted in FIG. 23.

FIG. 25 is a diagram illustrating a configuration example of the fixed-rate optical transmitter 43 depicted in FIG. 23. As illustrated, the fixed-rate optical transmitter 43 includes a baseband signal generating unit 420, an oscillator 421, a communication control unit 424, a light source 422, and a modulator 423. These components respectively correspond to the baseband signal generating unit 120, the oscillator 121, the communication control unit 124, the light source 122, and the modulator 123 in the multi-rate-receive/fixed-rate-transmit transponder 11 described with reference to FIG. 4.

The baseband signal generating unit 420 combines the code sequence and the routing information received from the multi-rate optical receiver 41 in each of the OLT units 40a to 40c and generates the baseband signal having a bit rate corresponding to the clock signal that the oscillator 421 outputs. Then, the modulator 423 generates the inter-base-station optical signal by modulating the carrier light with the baseband signal.

Figure 26:
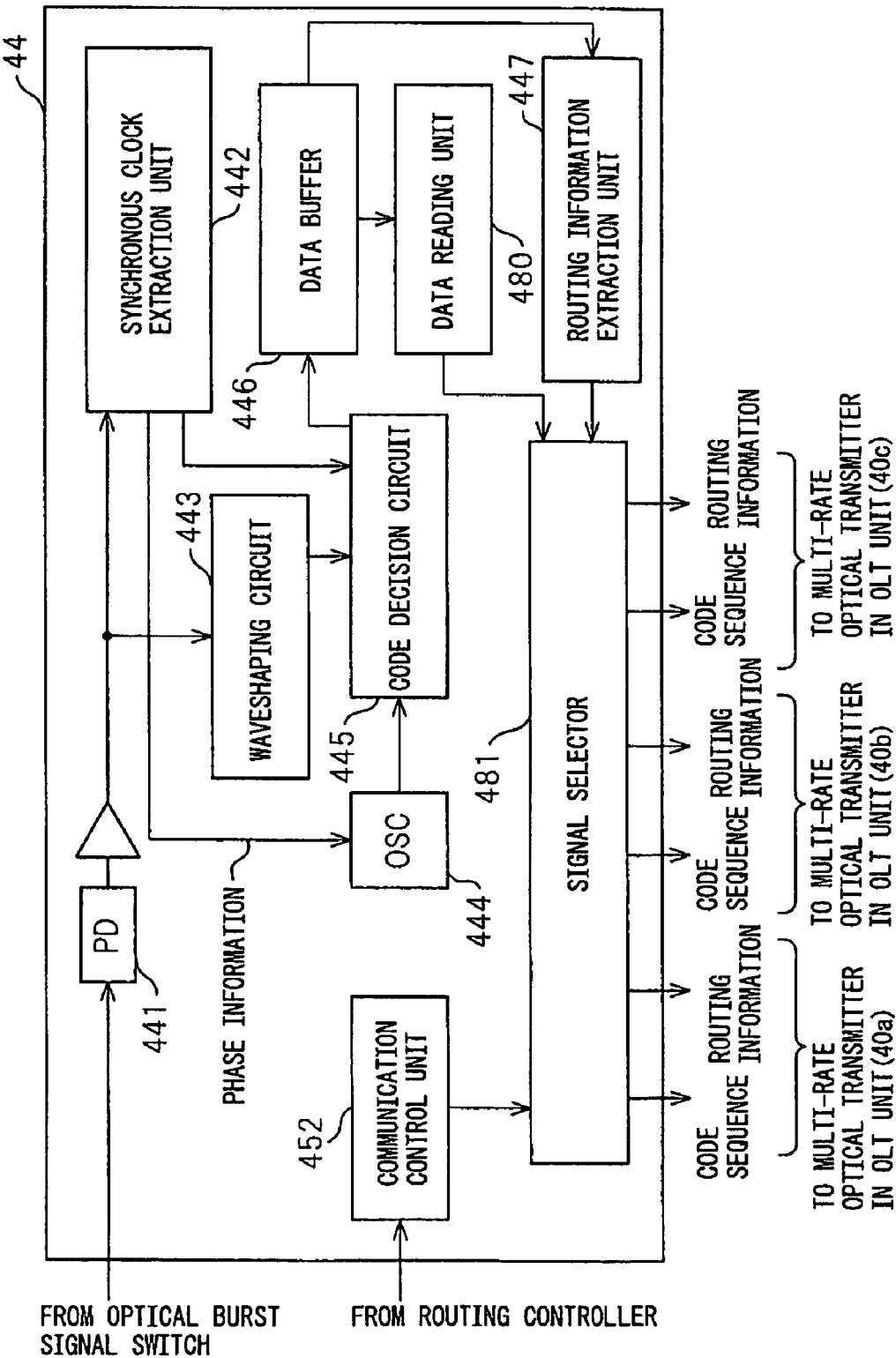
FIG. 26 is a diagram illustrating a configuration example of a fixed-rate optical receiver depicted in FIG. 23.

FIG. 26 is a diagram illustrating a configuration example of the fixed-rate optical receiver 44 depicted in FIG. 23. As illustrated, the fixed-rate optical receiver 44 includes a photodetector 441, a synchronous clock extraction unit 442, a waveshaping circuit 443, an oscillator 444, a code decision circuit 445, a data buffer 446, a routing information extraction unit 447, and a communication control unit 452. These component elements respectively correspond to the photodetector 141, the synchronous clock extraction unit 142, the waveshaping circuit 143, the oscillator 144, the code decision circuit 145, the data buffer 146, the routing information extraction unit 147, and the communication control unit 152 in the fixed-rate-receive/multi-rate-transmit transponder 12 illustrated in FIG. 6.

The fixed-rate optical receiver 44 further includes a data reading unit 480 which reads the code sequence of the received signal from the data buffer 446, and a signal selector 481.

The signal selector 481 receives the routing information of the received signal from the routing information extraction unit 447 or the communication control unit 452, and identifies the destination optical network unit to which the code sequence of the received signal, read out by the data reading unit 480, is to be delivered. Then, the signal selector 481 directs the routing information and the code sequence to the multi-rate optical transmitter 42 in a designated one of the OLT units 40a to 40c that belongs to the PON system containing the destination optical network unit.

Figure 27:
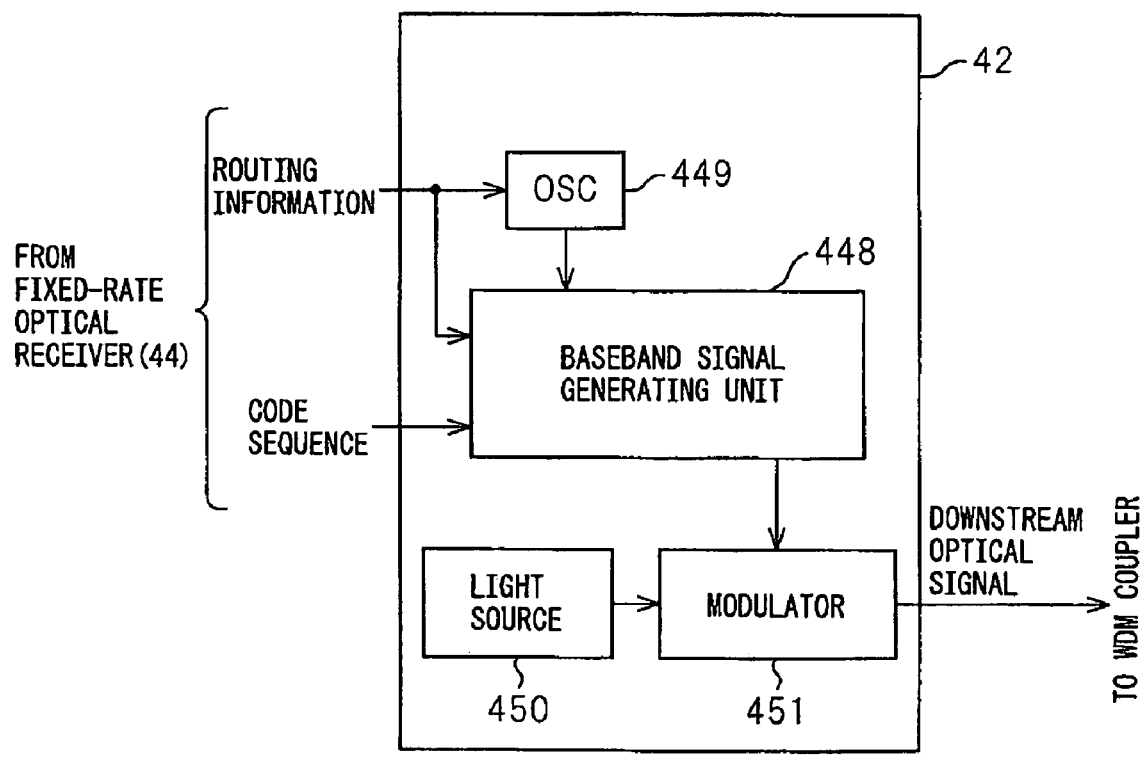
FIG. 27 is a diagram illustrating a first configuration example of a multi-rate optical transmitter depicted in FIG. 23.

FIG. 27 is a diagram illustrating a first configuration example of the multi-rate optical transmitter 42 depicted in FIG. 23. As illustrated, the multi-rate optical transmitter 42 includes an oscillator 449, a baseband signal generating unit 448, a light source 450, and a modulator 451.

The baseband signal generating unit 448 combines the code sequence and the routing information received from the fixed-rate optical receiver 44 and generates the baseband signal having a bit rate corresponding to the clock signal that the oscillator 449 outputs. Here, the oscillator 449 generates the clock signal corresponding to the bit rate of the optical network unit designated as the destination in accordance with the routing information received from the fixed-rate optical receiver 44. Then, the modulator 451 generates the downstream optical signal by modulating the carrier light with the baseband signal.

Figure 28:
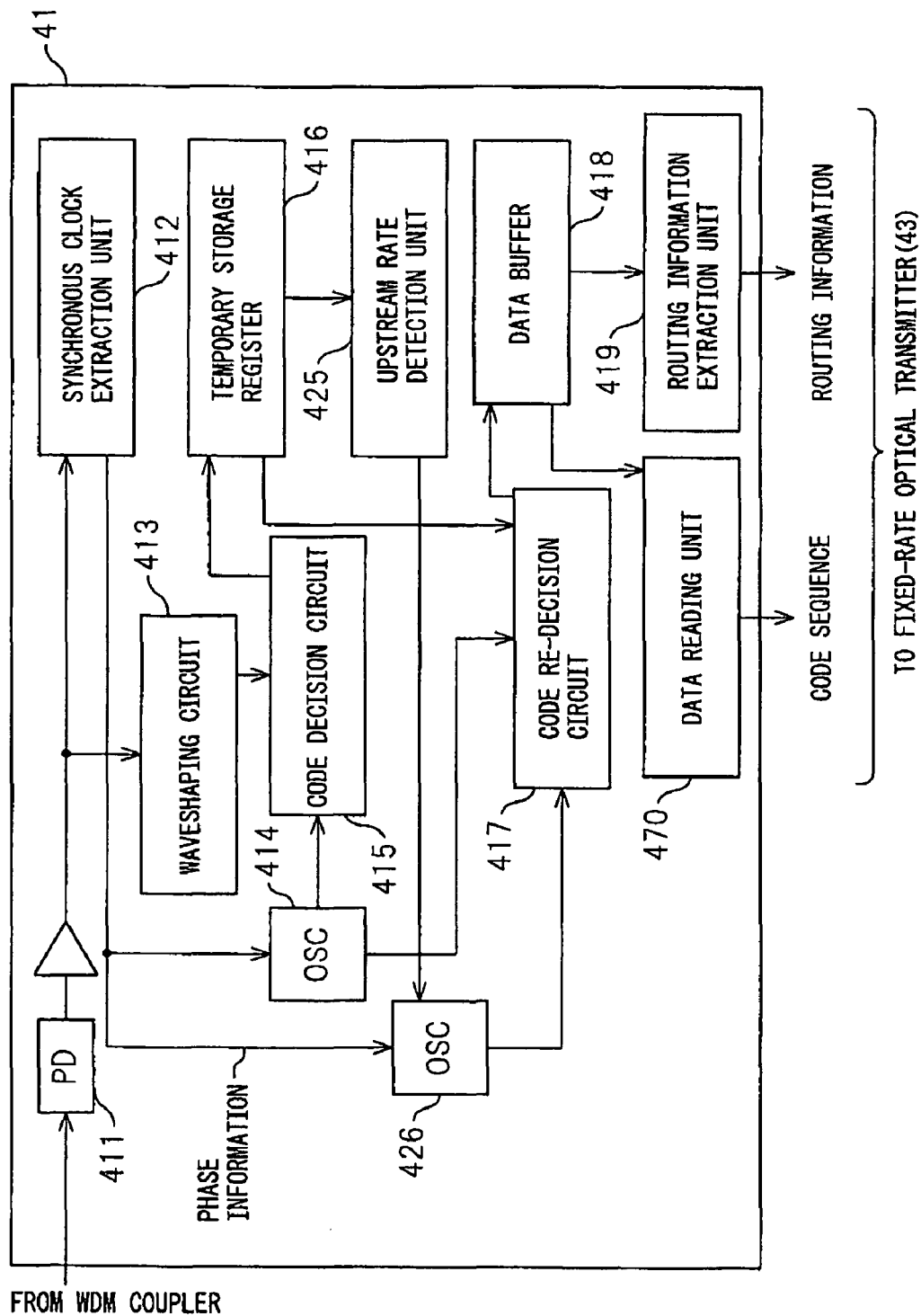
FIG. 28 is a diagram illustrating a second configuration example of the multi-rate optical receiver depicted in FIG. 23.

FIG. 28 is a diagram illustrating a second configuration example of the multi-rate optical receiver 41 depicted in FIG. 23. This configuration example includes an upstream rate detection unit 425 and an oscillator 426 which are respectively identical to the upstream rate detection unit 125 and the oscillator 126 in the multi-rate-receive/fixed-rate-transmit transponder illustrated in FIG. 8. The operation of the upstream rate detection unit 425 and the oscillator 426 is the same as the operation of the upstream rate detection unit 125 and the oscillator 126 described with reference to FIG. 8.

Figure 29:
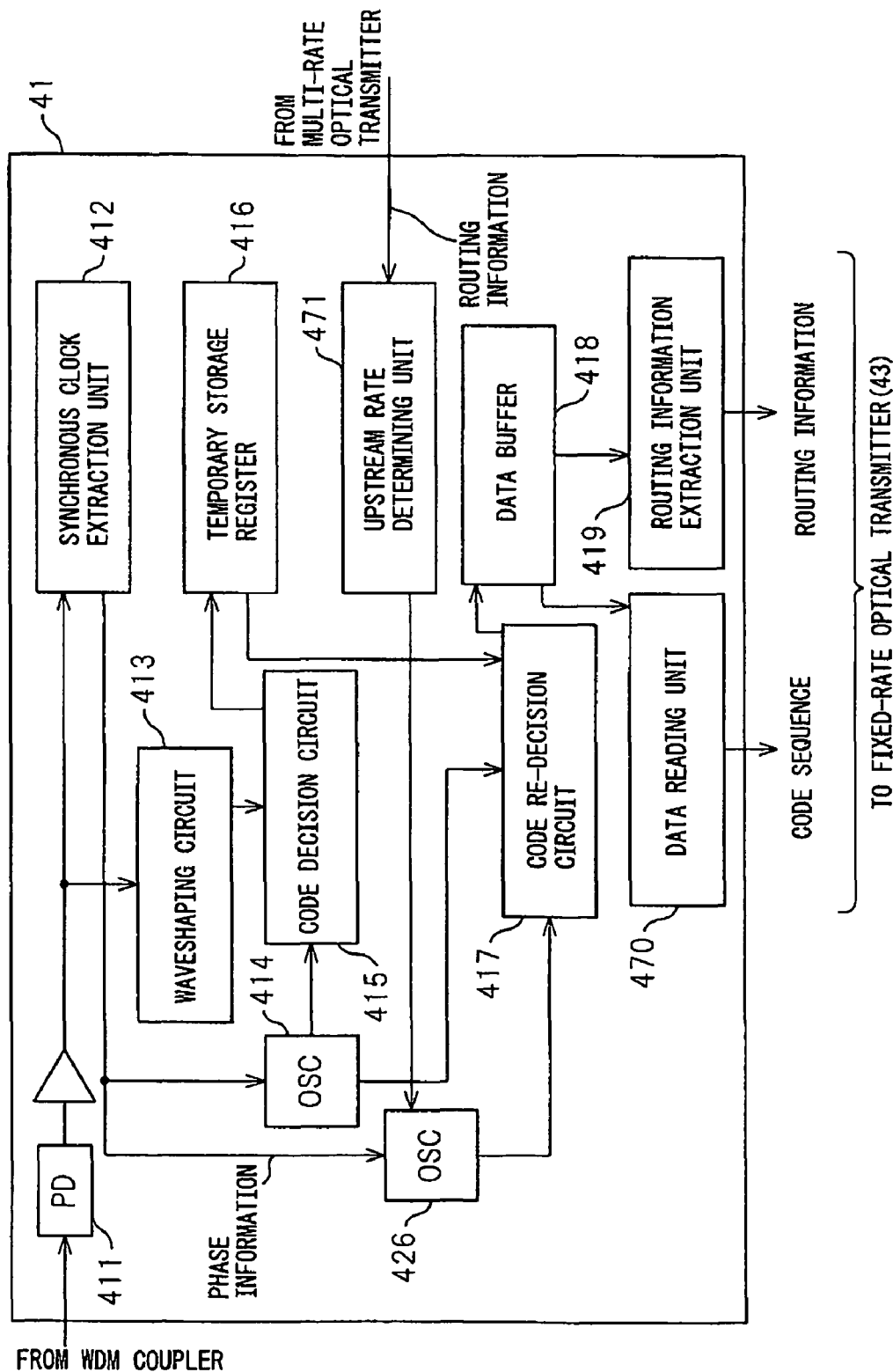
FIG. 29 is a diagram illustrating a third configuration example of the multi-rate optical receiver depicted in FIG. 23.
Figure 30:
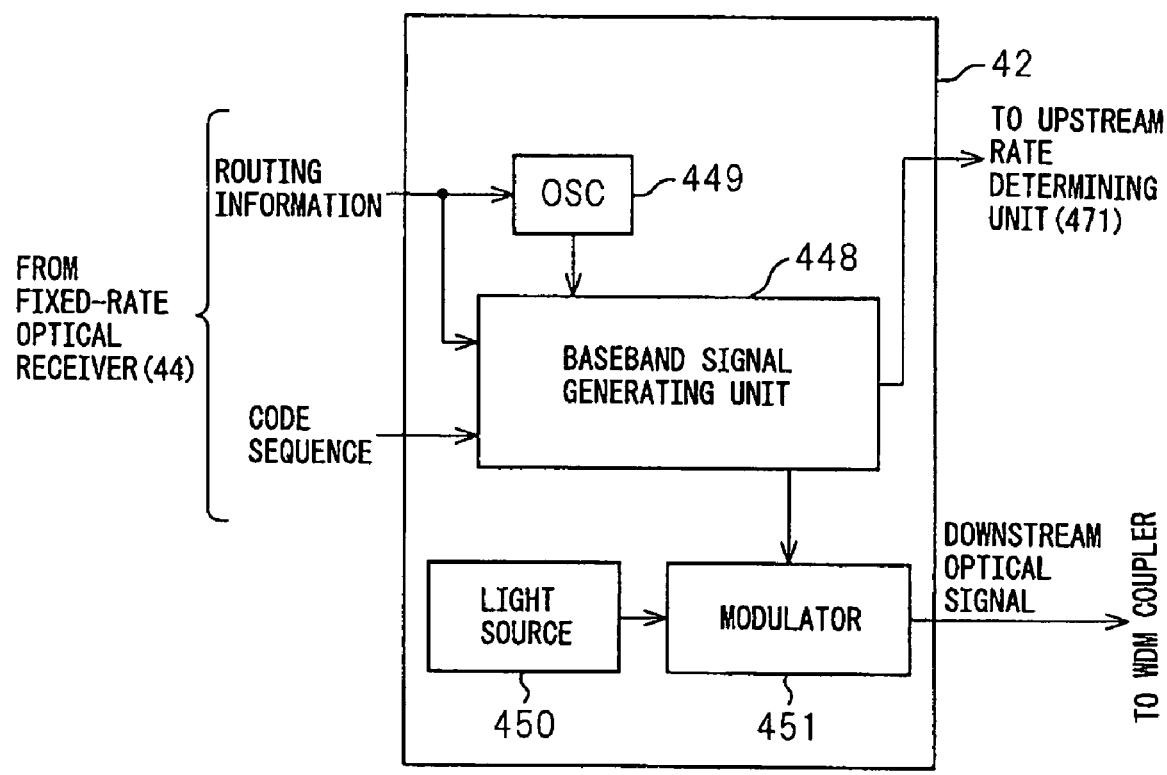
FIG. 30 is a diagram illustrating a second configuration example of the multi-rate optical transmitter depicted in FIG. 23.

FIG. 29 is a diagram illustrating a third configuration example of the multi-rate optical receiver 41 depicted in FIG. 23, and FIG. 30 is a diagram illustrating a second configuration example of the multi-rate optical transmitter 42 depicted in FIG. 23.

In this embodiment, the baseband signal generating unit 448 in the multi-rate optical transmitter 42 delivers information concerning the identifier of the optical network unit designated as the destination of the downstream optical signal, or the bit rate the optical network unit uses for operation, to the upstream rate determining unit 471 in the multi-rate optical receiver 41, just as the communication control unit 152 provided in the fixed-rate-receive/multi-rate-transmit transponder 12 illustrated in FIG. 16 delivers information concerning the identifier of the optical network unit designated as the destination of the downstream optical signal, or the bit rate the optical network unit uses for operation, to the communication control unit 124 in the multi-rate-receive/fixed-rate-transmit transponder illustrated in FIG. 15.

The upstream rate determining unit 471 determines the upstream bit rate in the same manner as the communication control unit 124 depicted in FIG. 15, and the oscillator 426 generates the clock signal corresponding to the upstream bit rate detected by the upstream rate determining unit 471. The code re-decision circuit 417 regenerates the signal sequence identical to the original code sequence by reading, at the frequency of the clock generated by the oscillator 426, the signal sequence obtained by reading out the provisional code sequence from the temporary storage register 416 at the frequency of the provisional decision clock, and stores the thus regenerated signal sequence in the data buffer 418.

While the present invention has been described in detail above with reference to the preferred embodiments, it should be understood by those skilled in the art that various modifications and changes can be made by anyone skilled in the art, and that all of such modifications and changes that come within the range of the true spirit and purpose of the present invention fall within the scope of the present invention as defined by the appended claims.

INDUSTRIAL APPLICABILITY

The present invention is applicable to an optical access network system in which the network from the central office of a communication provider up to the subscriber terminal is constructed from an optical communication network.

What is claimed is:

1. An optical communication base station which receives an upstream optical signal having an upstream bit rate specific to each one of a plurality of lower order communication units from a corresponding one of said plurality of lower order communication units, and which transmits a downstream optical signal having a downstream bit rate specific to each one of said plurality of lower order communication units to a designated one of said plurality of lower order communication units, said optical communication base station comprising:

a first optical signal conversion unit which changes the bit rate of said upstream optical signal and thereby converts said upstream optical signal into a fixed bit-rate inter-station optical signal to be received by a receiving correspondent station, including:
an optical-to-electrical conversion unit which converts said upstream optical signal into an electrical signal;
a code decision unit which makes code decisions on said electrical signal at a provisional decision clock frequency corresponding to a bit rate equal to an integral multiple of the highest of said upstream bit rates;
a storage unit which temporarily stores a code sequence obtained as a provisional code sequence by said code decisions; and
a code correction unit which regenerates an original code sequence by correcting code sequence length of said provisional code sequence temporarily stored in said storage unit;

a second optical signal conversion unit which converts said inter-station optical signal received from a transmitting correspondent station into said downstream optical signal by changing the bit rate of said inter-station optical signal according to said designated lower order communication unit; and a bit rate detection unit which detects said upstream bit rate based on a length of a receiving period of the provisional code sequence generated from a fixed bit length preamble of said upstream optical signal, wherein using said upstream bit rate, said code correction unit corrects the code sequence length of said provisional code sequence temporarily stored in said storage unit.

2. An optical communication base station as claimed in claim 1, wherein said first optical signal conversion unit converts said upstream optical signal as an optical burst signal into said inter-station optical signal as a fixed-bit rate optical burst signal, and said second optical signal conversion unit converts said inter-station optical signal as a fixed-bit rate optical burst signal into said downstream optical signal.

3. An optical communication base station as claimed in claim 2, further comprising:

an optical signal switch for exchanging said optical burst signals between a plurality of ports to which said first optical signal conversion unit, said second optical signal conversion unit, a transmission line to said receiving correspondent station, and a transmission line from said transmitting correspondent station are respectively connected; and a routing controller which controls routing of said optical burst signals by controlling said optical signal switch based on routing information accompanying each of said optical burst signals.

4. An optical communication base station as claimed in claim 1, further comprising:

a wavelength tunable light source which produces carrier light for said inter-station optical signal, and which changes the wavelength of said carrier light in accordance with the destination of said inter-station optical signal; and an optical splitter which separates by wavelength said inter-station optical signal received from said transmitting correspondent station.

5. An optical communication base station as claimed in claim 1, further comprising a synchronous clock extraction unit which extracts a synchronous clock from said electrical signal, and wherein using said synchronous clock extracted by said synchronous clock extraction unit, said code correction unit corrects the code sequence length of said provisional code sequence temporarily stored in said storage unit.

6. An optical communication base station as claimed in claim 1, wherein the upstream bit rate that each one of said lower order communication units uses is known, and said lower order communication units each transmit said upstream optical signal only when said downstream optical signal is received, and wherein according to which of said lower order communication units to which said downstream optical signal is transmitted, said code correction unit corrects, by using said known bit rate that said lower order communication unit uses, the code sequence length of said provisional code sequence obtained by said code decisions made on said received upstream optical signal.

7. An optical communication base station as claimed in claim 1, further comprising:

a routing information extracting unit which extracts routing information of said upstream optical signal from said original code sequence; and a modulation unit which generates said inter-station optical signal by modulating prescribed carrier light with said original code sequence.

8. An optical signal conversion apparatus for converting a first optical signal into a fixed bit-rate second optical signal, said first optical signal being received from each one of a plurality of communication units that transmit optical signals at different bit rates, said apparatus comprising:
- an optical-to-electrical conversion unit which converts said first optical signal into an electrical signal;
- a code decision unit which makes code decisions on said electrical signal at a provisional decision clock frequency corresponding to a bit rate equal to an integral multiple of the highest of the bit rates that said plurality of communication units use;
- a storage unit which temporarily stores a code sequence obtained as a provisional code sequence by said code decisions;
- a code correction unit which regenerates an original code sequence by correcting code sequence length of said provisional code sequence temporarily stored in said storage unit; and
- a bit rate detection unit which detects the bit rate of said first optical signal based on a length of a receiving period of said provisional code sequence generated from a fixed bit length preamble of said first optical signal,
- wherein using said bit rate detected by said bit rate detection unit, said code correction unit corrects the code sequence length of said provisional code sequence temporarily stored in said storage unit.

9. An optical signal conversion apparatus as claimed in claim 8, further comprising a synchronous clock extraction unit which extracts a synchronous clock from said electrical signal, and wherein
- using said synchronous clock extracted by said synchronous clock extraction unit, said code correction unit corrects the code sequence length of said provisional code sequence temporarily stored in said storage unit.

10. An optical signal conversion apparatus as claimed in claim 8, further comprising:
- a routing information extracting unit which extracts routing information of said first optical signal from said original code sequence; and
- a modulation unit which generates said second optical signal by modulating prescribed carrier light with said original code sequence.

11. An optical signal conversion method for converting a first optical signal into a fixed bit-rate second optical signal, said first optical signal being received from each one of a plurality of communication units that transmit optical signals at different bit rates, said method comprising:
- converting said first optical signal into an electrical signal;
- making code decisions on said electrical signal at a provisional decision clock frequency corresponding to a bit rate equal to an integral multiple of the highest of the bit rates that said plurality of communication units use;
- temporarily storing in a specified storage unit a code sequence obtained as a provisional code sequence by said code decisions;
- detecting the bit rate of said first optical signal based on a length of a receiving period of the provisional code sequence generated from a fixed bit length preamble of said first optical signal,
- regenerating an original code sequence by correcting code sequence length of said provisional code sequence temporarily stored in said storage unit based on the bit rate detected; and
- generating said second optical signal by modulating prescribed carrier light with said original code sequence.

* * * * *

UNITED STATES PATENT AND TRADEMARK OFFICE
CERTIFICATE OF CORRECTION

| | | |
|---|---|---|
| PATENT NO. | : 8,275,258 B2 | Page 1 of 1 |
| APPLICATION NO. | : 12/461267 | |
| DATED | : September 25, 2012 | |
| INVENTOR(S) | : Yutaka Kai et al. | |

It is certified that error appears in the above-identified patent and that said Letters Patent is hereby corrected as shown below:

Title Page Col. 1, Item [56], Line 3, Delete "171,117" and insert -- 7,171,117 --, therefor.

Signed and Sealed this
Eighteenth Day of December, 2012

David J. Kappos
*Director of the United States Patent and Trademark Office*